US008775698B2

(12) United States Patent
Archer et al.

(10) Patent No.: US 8,775,698 B2
(45) Date of Patent: *Jul. 8, 2014

(54) PERFORMING AN ALL-TO-ALL DATA EXCHANGE ON A PLURALITY OF DATA BUFFERS BY PERFORMING SWAP OPERATIONS

(75) Inventors: Charles J. Archer, Rochester, MN (US); Amanda E. Peters, Cambridge, MA (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/459,832

(22) Filed: Apr. 30, 2012

(65) Prior Publication Data

US 2012/0216021 A1    Aug. 23, 2012

Related U.S. Application Data

(63) Continuation of application No. 12/176,816, filed on Jul. 21, 2008.

(51) Int. Cl.
*G06F 3/00* (2006.01)
*G06F 15/16* (2006.01)

(52) U.S. Cl.
USPC ............................................. 710/52; 709/201

(58) Field of Classification Search
None
See application file for complete search history.

(56) References Cited

U.S. PATENT DOCUMENTS

| 4,715,032 | A | 12/1987 | Nilsson |
| 4,843,540 | A | 6/1989 | Stolfo |
| 5,101,480 | A | 3/1992 | Shin et al. |
| 5,105,424 | A | 4/1992 | Flaig et al. |
| 5,333,279 | A | 7/1994 | Dunning |
| 5,377,333 | A | 12/1994 | Nakagoshi et al. |
| 5,513,371 | A | 4/1996 | Cypher et al. |
| 5,541,914 | A | 7/1996 | Krishnamoorthy et al. |
| 5,590,334 | A | 12/1996 | Saulpaugh et al. |

(Continued)

FOREIGN PATENT DOCUMENTS

| EP | 1835414 A2 | 9/2007 |
| JP | 2000156039 | 6/2000 |

(Continued)

OTHER PUBLICATIONS

Swap two variables using XOR, Jan. 16, 2007, www.betterexplained.com.*

(Continued)

*Primary Examiner* — Hyun Nam
(74) *Attorney, Agent, or Firm* — Biggers Kennedy Lenart Spraggins LLP

(57) ABSTRACT

Methods, apparatus, and products are disclosed for performing an all-to-all exchange on n number of data buffers using XOR swap operations. Each data buffer has n number of data elements. Performing an all-to-all exchange on n number of data buffers using XOR swap operations includes for each rank value of i and j where i is greater than j and where i is less than or equal to n: selecting data element i in data buffer j; selecting data element j in data buffer i; and exchanging contents of data element i in data buffer j with contents of data element j in data buffer i using an XOR swap operation.

9 Claims, 11 Drawing Sheets

(56) References Cited

U.S. PATENT DOCUMENTS

| | | | |
|---|---|---|---|
| 5,617,538 | A | 4/1997 | Heller |
| 5,668,815 | A | 9/1997 | Gittinger et al. |
| 5,721,828 | A | 2/1998 | Frisch |
| 5,737,628 | A | 4/1998 | Birrittella et al. |
| 5,805,589 | A | 9/1998 | Hochschild et al. |
| 5,822,604 | A | 10/1998 | Ogasawara et al. |
| 5,822,605 | A | 10/1998 | Higuchi et al. |
| 5,826,049 | A | 10/1998 | Ogata et al. |
| 5,832,215 | A | 11/1998 | Kato et al. |
| 5,864,712 | A | 1/1999 | Carmichael et al. |
| 5,875,329 | A | 2/1999 | Shan |
| 5,878,241 | A | 3/1999 | Wilkinson et al. |
| 5,892,923 | A | 4/1999 | Yasuda et al. |
| 5,937,202 | A | 8/1999 | Crosetto et al. |
| 5,949,988 | A | 9/1999 | Feisullin et al. |
| 5,958,017 | A | 9/1999 | Scott et al. |
| 6,000,024 | A | 12/1999 | Maddox et al. |
| 6,038,651 | A | 3/2000 | VanHuben et al. |
| 6,067,609 | A | 5/2000 | Meeker et al. |
| 6,076,131 | A | 6/2000 | Nugent |
| 6,108,692 | A | 8/2000 | Van Seters et al. |
| 6,167,502 | A | 12/2000 | Pechanek et al. |
| 6,212,617 | B1 | 4/2001 | Hardwick |
| 6,230,252 | B1 | 5/2001 | Passint et al. |
| 6,272,548 | B1 | 8/2001 | Cotter et al. |
| 6,289,424 | B1 | 9/2001 | Stevens |
| 6,292,822 | B1 | 9/2001 | Hardwick |
| 6,334,138 | B1 | 12/2001 | Kureya |
| 6,378,029 | B1 | 4/2002 | Venkitakrishnan et al. |
| 6,473,849 | B1 | 10/2002 | Keller et al. |
| 6,480,885 | B1 | 11/2002 | Olivier |
| 6,480,918 | B1 | 11/2002 | McKenney et al. |
| 6,634,301 | B1 | 10/2003 | Mulinix |
| 6,647,438 | B1 | 11/2003 | Conner et al. |
| 6,691,101 | B2 | 2/2004 | MacNicol et al. |
| 6,714,552 | B1 | 3/2004 | Cotter |
| 6,742,063 | B1 | 5/2004 | Hellum et al. |
| 6,754,211 | B1 | 6/2004 | Brown |
| 6,834,301 | B1 | 12/2004 | Hanchett |
| 6,914,606 | B2 | 7/2005 | Amemiya et al. |
| 6,954,806 | B2 | 10/2005 | Yosimoto et al. |
| 6,982,960 | B2 | 1/2006 | Lee et al. |
| 7,010,576 | B2 | 3/2006 | Bae |
| 7,073,043 | B2 | 7/2006 | Arimilli et al. |
| 7,133,359 | B2 | 11/2006 | Weis |
| 7,143,392 | B2 | 11/2006 | Ii et al. |
| 7,171,484 | B1 | 1/2007 | Krause et al. |
| 7,197,624 | B2 | 3/2007 | Pechanek et al. |
| 7,203,743 | B2 | 4/2007 | Shah-Heydari |
| 7,263,598 | B2 | 8/2007 | Ambuel |
| 7,263,698 | B2 | 8/2007 | Wildhagen et al. |
| 7,284,033 | B2 | 10/2007 | Jhanji |
| 7,352,739 | B1 | 4/2008 | Rangarajan et al. |
| 7,363,474 | B2 | 4/2008 | Rodgers et al. |
| 7,487,501 | B2 | 2/2009 | Silvera et al. |
| 7,496,699 | B2 | 2/2009 | Pope et al. |
| 7,499,468 | B2 | 3/2009 | Montgomery, Jr. |
| 7,509,244 | B1 | 3/2009 | Shakeri et al. |
| 7,539,989 | B2 | 5/2009 | Blackmore et al. |
| 7,555,566 | B2 | 6/2009 | Blumrich et al. |
| 7,571,439 | B1 | 8/2009 | Rabinovici et al. |
| 7,587,516 | B2 | 9/2009 | Bhanot et al. |
| 7,590,983 | B2 | 9/2009 | Neiman et al. |
| 7,600,095 | B2 | 10/2009 | Archer et al. |
| 7,613,134 | B2 | 11/2009 | Rangarajan et al. |
| 7,640,315 | B1 | 12/2009 | Meyer et al. |
| 7,673,011 | B2 | 3/2010 | Archer et al. |
| 7,697,443 | B2 | 4/2010 | Archer et al. |
| 7,707,366 | B2 | 4/2010 | Tagawa |
| 7,725,329 | B2 | 5/2010 | Kil et al. |
| 7,739,451 | B1 | 6/2010 | Wiedenman et al. |
| 7,774,448 | B2 | 8/2010 | Shah-Heydari |
| 7,796,527 | B2 | 9/2010 | Archer et al. |
| 7,808,930 | B2 | 10/2010 | Boers et al. |
| 7,835,378 | B2 | 11/2010 | Wijnands et al. |
| 7,853,639 | B2 | 12/2010 | Archer et al. |
| 7,936,681 | B2 | 5/2011 | Gong et al. |
| 7,948,999 | B2 | 5/2011 | Blocksome et al. |
| 7,974,221 | B2 | 7/2011 | Tamassia et al. |
| 7,984,448 | B2 | 7/2011 | Almasi et al. |
| 7,991,857 | B2 | 8/2011 | Berg et al. |
| 8,090,797 | B2 | 1/2012 | Chinta et al. |
| 8,131,825 | B2 | 3/2012 | Nord et al. |
| 8,136,104 | B2 | 3/2012 | Papakipos et al. |
| 8,161,268 | B2 | 4/2012 | Faraj |
| 8,161,480 | B2 | 4/2012 | Archer et al. |
| 8,326,943 | B2 | 12/2012 | Chinta et al. |
| 8,365,186 | B2 | 1/2013 | Faraj et al. |
| 8,436,720 | B2 | 5/2013 | Archer et al. |
| 8,565,089 | B2 | 10/2013 | Archer et al. |
| 2001/0005873 | A1 | 6/2001 | Yasuda et al. |
| 2002/0016901 | A1 | 2/2002 | Carvey et al. |
| 2002/0065984 | A1 | 5/2002 | Thompson et al. |
| 2002/0091819 | A1 | 7/2002 | Melchione et al. |
| 2002/0144027 | A1 | 10/2002 | Schmisseur |
| 2003/0041173 | A1 | 2/2003 | Hoyle |
| 2003/0182376 | A1 | 9/2003 | Smith |
| 2003/0188054 | A1 | 10/2003 | Yosimoto et al. |
| 2003/0212877 | A1 | 11/2003 | Dally et al. |
| 2003/0225852 | A1 | 12/2003 | Bae |
| 2004/0034678 | A1 | 2/2004 | Kuszmaul et al. |
| 2004/0073590 | A1 | 4/2004 | Bhanot et al. |
| 2004/0073755 | A1 | 4/2004 | Webb et al. |
| 2005/0094577 | A1 | 5/2005 | Ashwood-Smith |
| 2005/0135395 | A1 | 6/2005 | Fan et al. |
| 2005/0165980 | A1 | 7/2005 | Clayton et al. |
| 2005/0243711 | A1 | 11/2005 | Alicherry et al. |
| 2006/0156312 | A1 | 7/2006 | Supalov |
| 2006/0168359 | A1 | 7/2006 | Bissessur et al. |
| 2006/0179181 | A1 | 8/2006 | Seong |
| 2006/0182137 | A1 | 8/2006 | Zhou et al. |
| 2006/0282838 | A1 | 12/2006 | Gupta et al. |
| 2007/0011408 | A1 | 1/2007 | Shen et al. |
| 2007/0081516 | A1 | 4/2007 | Rimilli et al. |
| 2007/0110063 | A1 | 5/2007 | Tang et al. |
| 2007/0174558 | A1 | 7/2007 | Jia et al. |
| 2007/0226686 | A1 | 9/2007 | Beardslee et al. |
| 2007/0242609 | A1 | 10/2007 | Archer et al. |
| 2007/0242611 | A1 | 10/2007 | Archer et al. |
| 2007/0242685 | A1 | 10/2007 | Archer et al. |
| 2007/0245122 | A1 | 10/2007 | Archer et al. |
| 2007/0260909 | A1 | 11/2007 | Archer et al. |
| 2007/0288935 | A1 | 12/2007 | Tannenbaum et al. |
| 2007/0294666 | A1 | 12/2007 | Papakipos et al. |
| 2007/0294681 | A1 | 12/2007 | Tuck et al. |
| 2008/0022079 | A1 | 1/2008 | Archer et al. |
| 2008/0077366 | A1 | 3/2008 | Neuse et al. |
| 2008/0101232 | A1 | 5/2008 | Archer et al. |
| 2008/0109569 | A1 | 5/2008 | Leonard et al. |
| 2008/0127146 | A1 | 5/2008 | Liao et al. |
| 2008/0201603 | A1 | 8/2008 | Ritz et al. |
| 2008/0229059 | A1 | 9/2008 | May |
| 2008/0250325 | A1* | 10/2008 | Feigenbaum et al. ........ 715/744 |
| 2008/0263320 | A1 | 10/2008 | Archer et al. |
| 2008/0263329 | A1 | 10/2008 | Archer et al. |
| 2008/0273543 | A1 | 11/2008 | Blocksome et al. |
| 2008/0288949 | A1 | 11/2008 | Bohra et al. |
| 2008/0301683 | A1 | 12/2008 | Archer et al. |
| 2008/0313661 | A1 | 12/2008 | Blocksome et al. |
| 2009/0006663 | A1 | 1/2009 | Archer et al. |
| 2009/0019218 | A1 | 1/2009 | Sinclair et al. |
| 2009/0019258 | A1 | 1/2009 | Shi |
| 2009/0037377 | A1 | 2/2009 | Archer et al. |
| 2009/0037511 | A1 | 2/2009 | Almasi et al. |
| 2009/0037707 | A1 | 2/2009 | Blocksome |
| 2009/0040946 | A1 | 2/2009 | Archer et al. |
| 2009/0043910 | A1 | 2/2009 | Barsness et al. |
| 2009/0052462 | A1 | 2/2009 | Archer et al. |
| 2009/0055474 | A1 | 2/2009 | Archer et al. |
| 2009/0064140 | A1 | 3/2009 | Arimilli et al. |
| 2009/0064149 | A1 | 3/2009 | Singh et al. |
| 2009/0064176 | A1 | 3/2009 | Ohly et al. |
| 2009/0067334 | A1 | 3/2009 | Archer et al. |
| 2009/0089512 | A1 | 4/2009 | Shen et al. |

(56) References Cited

U.S. PATENT DOCUMENTS

| | | | |
|---|---|---|---|
| 2009/0113308 A1 | 4/2009 | Almasi et al. | |
| 2009/0154486 A1 | 6/2009 | Archer et al. | |
| 2009/0196361 A1 | 8/2009 | Chan et al. | |
| 2009/0240838 A1 | 9/2009 | Berg et al. | |
| 2009/0240915 A1 | 9/2009 | Faraj | |
| 2009/0245134 A1 | 10/2009 | Archer et al. | |
| 2009/0248712 A1 | 10/2009 | Yuan | |
| 2009/0259713 A1 | 10/2009 | Blumrich et al. | |
| 2009/0292905 A1 | 11/2009 | Faraj | |
| 2009/0307467 A1 | 12/2009 | Faraj | |
| 2009/0310544 A1 | 12/2009 | Jain et al. | |
| 2009/0319621 A1 | 12/2009 | Barsness et al. | |
| 2010/0017420 A1 | 1/2010 | Archer et al. | |
| 2010/0023631 A1 | 1/2010 | Archer et al. | |
| 2010/0082788 A1 | 4/2010 | Mundy | |
| 2010/0185718 A1* | 7/2010 | Archer et al. | 709/201 |
| 2010/0191911 A1 | 7/2010 | Heddes et al. | |
| 2010/0274997 A1 | 10/2010 | Archer et al. | |
| 2011/0010471 A1 | 1/2011 | Heidelberger et al. | |
| 2011/0119673 A1 | 5/2011 | Bloch et al. | |
| 2011/0125974 A1 | 5/2011 | Anderson | |
| 2011/0153908 A1 | 6/2011 | Schaefer et al. | |
| 2011/0179134 A1 | 7/2011 | Mayo et al. | |
| 2011/0238950 A1 | 9/2011 | Archer et al. | |
| 2011/0258245 A1 | 10/2011 | Blocksome et al. | |
| 2011/0258627 A1 | 10/2011 | Faraj et al. | |
| 2011/0267197 A1 | 11/2011 | Archer et al. | |
| 2011/0270986 A1 | 11/2011 | Archer et al. | |
| 2011/0289177 A1 | 11/2011 | Archer et al. | |
| 2011/0296137 A1 | 12/2011 | Archer et al. | |
| 2011/0296139 A1 | 12/2011 | Archer et al. | |
| 2012/0066284 A1 | 3/2012 | Archer et al. | |
| 2012/0117361 A1 | 5/2012 | Archer et al. | |
| 2012/0179881 A1 | 7/2012 | Archer et al. | |
| 2012/0197882 A1 | 8/2012 | Jensen | |

FOREIGN PATENT DOCUMENTS

| | | |
|---|---|---|
| JP | 2000156039 A | 6/2000 |
| JP | 2003317487 | 11/2003 |
| JP | 2003317487 A | 11/2003 |
| WO | WO 2007/057281 A1 | 5/2007 |

OTHER PUBLICATIONS

Sunggu, et al., "Interleaved All-To-All Reliable Broadcast on Meshes and Hypercubes", IEEE Transactions on Parallel and Distributed Systems, May 1994, pp. 449-458, vol. 5, No. 5, IEEE Xplore.

Bruck, et al. Efficient Algorithms for All-To-All Communications in Multiport Message-Passing Systems, IEEE Transactions on Parallel and Distributed Systems, vol. 8, Issue: 11, pp. 1143-1156, Nov. 1997, ISSN: 1045-9219.

Herbordt, M., et al., "Computing Parallel Prefix and Reduction Using Coterie Structures"; Fourth Symposium on the Frontiers of Massively Parallel Computation; Oct. 19-21, 1992, pp. 141-149, IEEE Xplore.

Fisher, A., et al., "Computing the Hough Transform on a Scan Line Array Processor [image processing]", IEEE Transactions on Pattern Analysis and Machine Intelligence, vol. 11, Issue: 3, Mar. 1989, pp. 262-265, IEEE Xplore.

Matsuda., et al., "Efficient MPI Collective Operations for Clusters in Long-and-Fast Networks" , pp. 1-9, 2006 IEEE International Conference on Cluster Computing, Sep. 2006, IEEE.

Oh, "An All-Reduce Operation in Star Networks Using All-to-All Broadcast Communication Patterns", V.S. Sunderam et al. (Eds.): ICCS 2005, LNCS 3514, pp. 419-426, 2005, Springer-Verlag Berlin Heidelberg 2005.

Yuan, et al., "Bandwidth Efficient All-reduce Operation on Tree Topologies", IEEE IPDPS Workshop on High-Level Parallel Programming Models and Supportive Environments, 2007, pp. 1-8, IEEE.

Tanenbaum, A., "Structured Computer Organization", 1984, pp. 1-5, Second Edition, Prentice-Hall, Inc., Englewood Cliffs, N.J., USA, ISBN: 0-13-854489-1.

Stolfo, et al., DADO: A Tree-Structured Machine Architecture for Production Systems, AAAI-82 Proceedings, 1982, AAAI (www.aaai.org), pp. 242-246, Columbia University.

Rosenberg, J., "Dictionary of Computers, Information Processing & Telecommunications", 1987, pp. 1-5, Second Edition, John Wiley & Sons, New York.

"Depth-first search—Wikipedia, the free encyclopedia", http://web.archive.org/web/20070505212029/http://en.wikipedia.org/wiki/Depth-first_search, Accessed: Apr. 29, 2009, pp. 1-5.

Specification of U.S. Appl. No. 60/271,124, filed Feb. 24, 2001, pp. 12-13, 27 and 42-43.

Sistare, et al., "Optimization of MPI collectives on clusters of large-scale SMP's", Conference on High Performance Networking and Computing, Proceedings of the 1999 ACM/IEEE Conference on Supercomputing; 1999, pp. 1-18, ACM, New York, USA.

Dictonary.com Define: "Computer" http://dictionary.reference.com/browse/computer accessed Nov. 4, 2011 5 pp.

Shrimali et al., "Building Packet Buffers Using Interleaved Memories", High Performance Switching and Routing, 2005. HPSR, May 2005, 5pp.

Office Action, U.S. Appl. No. 11/279,620, Mar. 4, 2008.
Final Office Action, U.S. Appl. No. 11/279,620, Sep. 3, 2008.
Final Office Action, U.S. Appl. No. 11/279,620, Dec. 29, 2008.
Office Action U.S. Appl. No. 11/459,387, Dec. 13, 2007.
Final Office Action, U.S. Appl. No. 11/459,387, Jul. 11, 2008.
Office Action U.S. Appl. No. 11/459,387, Mar. 18, 2009.
Office Action, U.S. Appl. No. 11/737,209, Jul. 20, 2009.
Office Action, U.S. Appl. No. 11/737,286, Feb. 9, 2009.
Notice of Allowance, U.S. Appl. No. 11/737,286, May 26, 2009.
Office Action, U.S. Appl. No. 11/754,740, Apr. 11, 2011.
Final Office Action, U.S. Appl. No. 11/754,740, Aug. 25, 2011.
Notice of Allowance, U.S. Appl. No. 11/754,740, Nov. 8, 2011.
Office Action, U.S. Appl. No. 11/754,782, Jun. 23, 2011.
Notice of Allowance, U.S. Appl. No. 11/754,782, Dec. 16, 2011.
Office Action, U.S. Appl. No. 11/769,367, Apr. 3, 2009.
Office Action, U.S. Appl. No. 11/769,367, Apr. 28, 2010.
Final Office Action, U.S. Appl. No. 11/769,367, Sep. 28, 2010.
Office Action, U.S. Appl. No. 11/832,918, Nov. 23, 2009.
Notice of Allowance, U.S. Appl. No. 11/832,918, Jun. 21, 2010.
Office Action, U.S. Appl. No. 11/834,153, May 4, 2009.
Office Action, U.S. Appl. No. 11/843,083, Jan. 14, 2010.
Notice of Allowance, U.S. Appl. No. 11/843,083, Jun. 30, 2010.
Office Action, U.S. Appl. No. 11/843,090, Sep. 4, 2009.
Notice of Allowance, U.S. Appl. No. 11/843,090, Jan. 26, 2010.
Office Action, U.S. Appl. No. 12/053,842, May 26, 2010.
Final Office Action, U.S. Appl. No. 12/053,842, Oct. 18, 2010.
Office Action, U.S. Appl. No. 12/053,842, Mar. 1, 2011.
Final Office Action, U.S. Appl. No. 12/053,842, May 23, 2011.
Notice of Allowance, U.S. Appl. No. 12/053,842, Oct. 14, 2011.
Office Action, U.S. Appl. No. 12/053,902, Oct. 6, 2010.
Notice of Allowance, U.S. Appl. No. 12/053,902, Mar. 18, 2011.
Office Action, U.S. Appl. No. 12/060,492, May 27, 2010.
Office Action, U.S. Appl. No. 12/124,763, Oct. 14, 2010.
Office Action, U.S. Appl. No. 12/176,816, Jun. 10, 2011.
Final Office Action, U.S. Appl. No. 12/176,816, Nov. 10, 2011.
Notice of Allowance, U.S. Appl. No. 12/760,020, Jul. 30, 2012.
Final Office Action, U.S. Appl. No. 12/060,492, Dec. 2, 2010.
Office Action, U.S. Appl. No. 12/060,492, Jul. 16, 2012.
Office Action, U.S. Appl. No. 12/124,745, Jun. 15, 2012.
Office Action, U.S. Appl. No. 12/124,756, Oct. 18, 2010.
Final Office Action, U.S. Appl. No. 12/124,756, Mar. 28, 2011.
Notice of Allowance, U.S. Appl. No. 12/124,756, Dec. 14, 2011.
Final Office Action, U.S. Appl. No. 12/124,763, Mar. 21, 2011.
Office Action, U.S. Appl. No. 12/176,816, Feb. 21, 2012.
Notice of Allowance, U.S. Appl. No. 12/176,816, May 25, 2012.
Office Action, U.S. Appl. No. 12/760,020, Feb. 13, 2012.
Office Action, U.S. Appl. No. 12/770,286, Jul. 5, 2012.
Notice of Allowance, U.S. Appl. No. 12/782,791, Aug. 22, 2012.
Notice of Allowance, U.S. Appl. No. 12/124,763, Oct. 3, 2012.
Final Office Action, U.S. Appl. No. 12/124,745, Nov. 23, 2012.

(56) References Cited

OTHER PUBLICATIONS

Office Action, U.S. Appl. No. 12/748,594, Sep. 14, 2012.
Office Action, U.S. Appl. No. 13/585,993, Oct. 11, 2012.
U.S. Appl. No. 13/672,740, filed Nov. 9, 2012.
U.S. Appl. No. 13/666,221, filed Nov. 1, 2012.
Notice of Allowance, U.S. Appl. No. 12/124,745, Mar. 6, 2013.
Final Office Action, U.S. Appl. No. 12/770,286, Jan. 29, 2013.
Final Office Action, U.S. Appl. No. 12/748,594, Mar. 22, 2013.
Notice of Allowance, U.S. Appl. No. 12/790,037, Mar. 15, 2013.
Final Office Action, U.S. Appl. No. 13/459,832, Jan. 4, 2013.
Notice of Allowance, U.S. Appl. No. 13/585,993, Jan. 31, 2013.
Office Action, U.S. Appl. No. 13/672,740, Apr. 2, 2013.
U.S. Appl. No. 12/770,286, filed Apr. 2010, Archer et al.
U.S. Appl. No. 12/748,594, filed Mar. 2010, Archer et al.
Final Office Action Dated Oct. 30, 2009 in U.S. Appl. No. 11/769,367.
Office Action Dated Jan. 14, 2010 in U.S. Appl. No. 11/843,083.
Office Action Dated Apr. 28, 2010 in U.S. Appl. No. 11/769,367.
Faraj, A., et al. "Automatic Generation and Tuning of MPI Collective Communication Routines", ICS' 05, Jun. 20-22, Boston, MA, USA. pp. 393-402, ACM.
Shrimali, G., et al., "Building Packet Buffers Using Interleaved Memories", (Proc. Sixth Workshop High Performance Switching and Routing (HPSR '05), May 2005, pp. 1-5, IEEE.
Ong, H., et al., "Kernel-level Single System Image for Petascale Computing", SIGOPS Oper. Syst. Rev., Apr. 2006, pp. 50-54, vol. 40, No. 2, ACM, New York, NY, USA.
Foster, I., et al., "Message Passing and Threads," Sourcebook of Parallel Computing, (Month Unknown) 2003, pp. 301-317, Morgan Kaufmann Publishers Inc. URL: http://web.eecs.utk.edu/~dongarra/WEB-PAGES/SPRING-2006/chapter10.pdf.
Simonsson, P., "Implementation of a Distributed Shared Memory using MPI," Chalmers University of Technology and Goteborg University, 2004, Supervised together with Anders Gidenstam, Master's Thesis, Finished Jan. 11, 2005, pp. 1-98, Goteborg, Sweden.
Message Passing Interface Forum,"MPI: A Message-Passing Interface Standard Version 2.2", MPI Specification, Sep. 4, 2009, pp. 1-647, High Performance Computing Center Stuttgart (HLRS).
Vetter, J., et al., "Real-Time Performance Monitoring, Adaptive Control, and Interactive Steering of Computational Grids", International Journal of High Performance Computing Applications Winter 2000, pp. 357-366 (10 Pages), vol. 14, No. 4, Sage Publications, Inc. Thousand Oaks, CA, USA.
Wikipedia, "Cache (computing)—Wikipedia, the free encyclopedia", Cache (computing), Edited by EmausBot, Jul. 22, 2011, Accessed Aug. 10, 2013, 6 Pages.
Wikipedia, "Fuzzy logic—Wikipedia, the free encyclopedia", Fuzzy Logic, Edited by Jeff Silvers, Aug. 1, 2011, Accessed Aug. 10, 2013, 10 Pages.
Wikipedia, "Depth-first search—Wikipedia, the free encyclopedia", http://web.archive.org/web/20070505212029/http://en.wikipedia.org/wiki/Depth-first_search, Apr. 29, 2009, pp. 1-5.
Sistare, S., et al., "Optimization of MPI collectives on clusters of large-scale SMP's", Conference on High Performance Networking and Computing, Proceedings of the 1999 ACM/IEEE Conference on Supercomputing; Nov. 1999, pp. 1-14, ACM, New York, NY, USA.
Tanenbaum, A., "Structured Computer Organization", Jan. 1984, pp. 1-5, Second Edition, Prentice-Hall, Inc., Englewood Cliffs, NJ, USA, ISBN: 0-13-854489-1.
Shaw, D., et al., DADO: A Tree-Structured Machine Architecture for Production Systems, AAAI-82 Proceedings, Jan. 1982, AAAI (www.aaai.org), pp. 242-246, AAAI Press.
Better Explained, "Swap two variables using XOR I BetterExplained", http://betterexplained.com/articles/swap-two-variables-using-xor, Accessed Jun. 4, 2011, pp. 1-8.
Rosenberg, J., "Dictionary of Computers, Information Processing & Telecommunications", Sep. 1987, pp. 1-5, Second Edition, John Wiley & Sons, New York, NY, USA.

* cited by examiner n = 4

| | Element 1 | Element 2 | Element 3 | Element 4 |
|---|---|---|---|---|
| Buffer 1 | A | B | C | D |
| Buffer 2 | E | F | G | H |
| Buffer 3 | I | J | K | L |
| Buffer 4 | M | N | O | P |

FIG. 6A n = 4

| | Element 1 | Element 2 | Element 3 | Element 4 |
|---|---|---|---|---|
| Buffer 1 | A | E | I | M |
| Buffer 2 | B | F | J | N |
| Buffer 3 | C | G | K | O |
| Buffer 4 | D | H | L | P |

| n = 4, i = 2, j = 1 | Element 1 | Element 2 | Element 3 | Element 4 |
|---|---|---|---|---|
| Buffer 1 | A | E | C | D |
| Buffer 2 | B | F | G | H |
| Buffer 3 | I | J | K | L |
| Buffer 4 | M | N | O | P |

FIG. 7B

| n = 4, i = 3, j = 1 | Element 1 | Element 2 | Element 3 | Element 4 |
|---|---|---|---|---|
| Buffer 1 | A | E | I | D |
| Buffer 2 | B | F | G | H |
| Buffer 3 | C | J | K | L |
| Buffer 4 | M | N | O | P |

FIG. 7C

| n = 4, i = 4, j = 1 | Element 1 | Element 2 | Element 3 | Element 4 |
|---|---|---|---|---|
| Buffer 1 | A | E | I | M |
| Buffer 2 | B | F | G | H |
| Buffer 3 | C | J | K | L |
| Buffer 4 | D | N | O | P |

FIG. 7D

| n = 4, i = 3, j = 2 | Element 1 | Element 2 | Element 3 | Element 4 |
|---|---|---|---|---|
| Buffer 1 | A | E | I | M |
| Buffer 2 | B | F | J | H |
| Buffer 3 | C | G | K | L |
| Buffer 4 | D | N | O | P |

FIG. 7E

| n = 4, i = 4, j = 2 | Element 1 | Element 2 | Element 3 | Element 4 |
|---|---|---|---|---|
| Buffer 1 | A | E | I | M |
| Buffer 2 | B | F | J | N |
| Buffer 3 | C | G | K | L |
| Buffer 4 | D | H | O | P |

FIG. 7F

| n = 4, i = 4, j = 3 | Element 1 | Element 2 | Element 3 | Element 4 |
|---|---|---|---|---|
| Buffer 1 | A | E | I | M |
| Buffer 2 | B | F | J | N |
| Buffer 3 | C | G | K | O |
| Buffer 4 | D | H | L | P |

PERFORMING AN ALL-TO-ALL DATA EXCHANGE ON A PLURALITY OF DATA BUFFERS BY PERFORMING SWAP OPERATIONS

CROSS-REFERENCE TO RELATED APPLICATION

This application is a continuation application of and claims priority from U.S. patent application Ser. No. 12/176,816, filed on Jul. 21, 2008.

BACKGROUND OF THE INVENTION

1. Field of the Invention

The field of the invention is data processing, or, more specifically, methods, apparatus, and products for performing an all-to-all exchange on n number of data buffers using XOR swap operations.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm. Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

While a torus network lends itself to point to point operations, a tree network typically is inefficient in point to point communication. A tree network, however, does provide high bandwidth and low latency for certain collective operations, message passing operations where all compute nodes participate simultaneously, such as, for example, an all-to-all operation. An all-to-all operation is a collective operation on an operational group of compute nodes that sends data from ranked segments of send buffers of all compute nodes to receive buffers in all compute nodes in rank order. The size of each ranked segment of the send buffer may be fixed or vary. Each compute node transmits the contents of each ranked segment of its send buffer only to a correspondingly ranked compute node. The contents of ranked segment 0 go to compute node of rank 0. The contents of ranked segment 1 go to compute node of rank 1, and so on. Each compute node upon receiving the data places it in rank order in a ranked segment of its receive buffer according to the rank of the sending compute node. Data from compute node of rank 0 goes in ranked segment 0. Data from compute node of rank 1 goes in ranked segment 1, and so on. Upon conclusion of an all-to-all operation, each compute node's receive buffer contains in rank order all the data from correspondingly ranked segments of the send buffers of all compute nodes in the operational group. The effect of an all-to-all operation is that all receive buffers in all compute nodes of an operational group contain different data, a matrix inversion of the data sent from the send buffers.

The drawback to current implementations of an all-to-all operation is that such implementations typically involves two sets of buffers—one set of buffers containing the data before the all-to-all operation and another set of buffers for storing the result of the all-to-all operation. Because the size of buffers typically involved in an all-to-all operation is often quite large and the amount of computer memory on each node is limited, utilizing two sets of buffers on the compute nodes consumes valuable memory resources that could otherwise be freed for additional storage needs.

SUMMARY OF THE INVENTION

Methods, apparatus, and products are disclosed for performing an all-to-all exchange on n number of data buffers using XOR swap operations. Each data buffer has n number of data elements. Performing an all-to-all exchange on n number of data buffers using XOR swap operations includes for each rank value of i and j where i is greater than j and where i is less than or equal to n: selecting data element i in data buffer j; selecting data element j in data buffer i; and exchanging contents of data element i in data buffer j with contents of data element j in data buffer i using an XOR swap operation.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 6A sets forth a line drawing illustrating four exemplary data buffers before performing an all-to-all exchange on n number of data buffers using XOR swap operations according to embodiments the present invention.

FIG. 6B sets forth a line drawing that illustrates the four exemplary data buffers of FIG. 6A after performing an all-to-all exchange on the four exemplary data buffers of FIG. 6A using XOR swap operations according to embodiments the present invention.

FIG. 7A sets forth a line drawing that illustrates the four exemplary data buffers of FIG. 6A after performing an all-to-all exchange on the four exemplary data buffers of FIG. 6A using XOR swap operations according to embodiments the present invention when rank values of i and j are two and one, respectively.

FIG. 7B sets forth a line drawing that illustrates the four exemplary data buffers of FIG. 7A after performing an all-to-all exchange on the four exemplary data buffers of FIG. 7A using XOR swap operations according to embodiments the present invention when rank values of i and j are three and one, respectively.

FIG. 7C sets forth a line drawing that illustrates the four exemplary data buffers of FIG. 7B after performing an all-to-all exchange on the four exemplary data buffers of FIG. 7B using XOR swap operations according to embodiments the present invention when rank values of i and j are four and one, respectively.

FIG. 7D sets forth a line drawing that illustrates the four exemplary data buffers of FIG. 7C after performing an all-to-all exchange on the four exemplary data buffers of FIG. 7C using XOR swap operations according to embodiments the present invention when rank values of i and j are three and two, respectively.

FIG. 7E sets forth a line drawing that illustrates the four exemplary data buffers of FIG. 7D after performing an all-to-all exchange on the four exemplary data buffers of FIG. 7D using XOR swap operations according to embodiments the present invention when rank values of i and j are four and two, respectively.

FIG. 7F sets forth a line drawing that illustrates the four exemplary data buffers of FIG. 7E after performing an all-to-all exchange on the four exemplary data buffers of FIG. 7E using XOR swap operations according to embodiments the present invention when rank values of i and j are four and three, respectively.

DETAILED DESCRIPTION OF EXEMPLARY EMBODIMENTS

Figure 1:
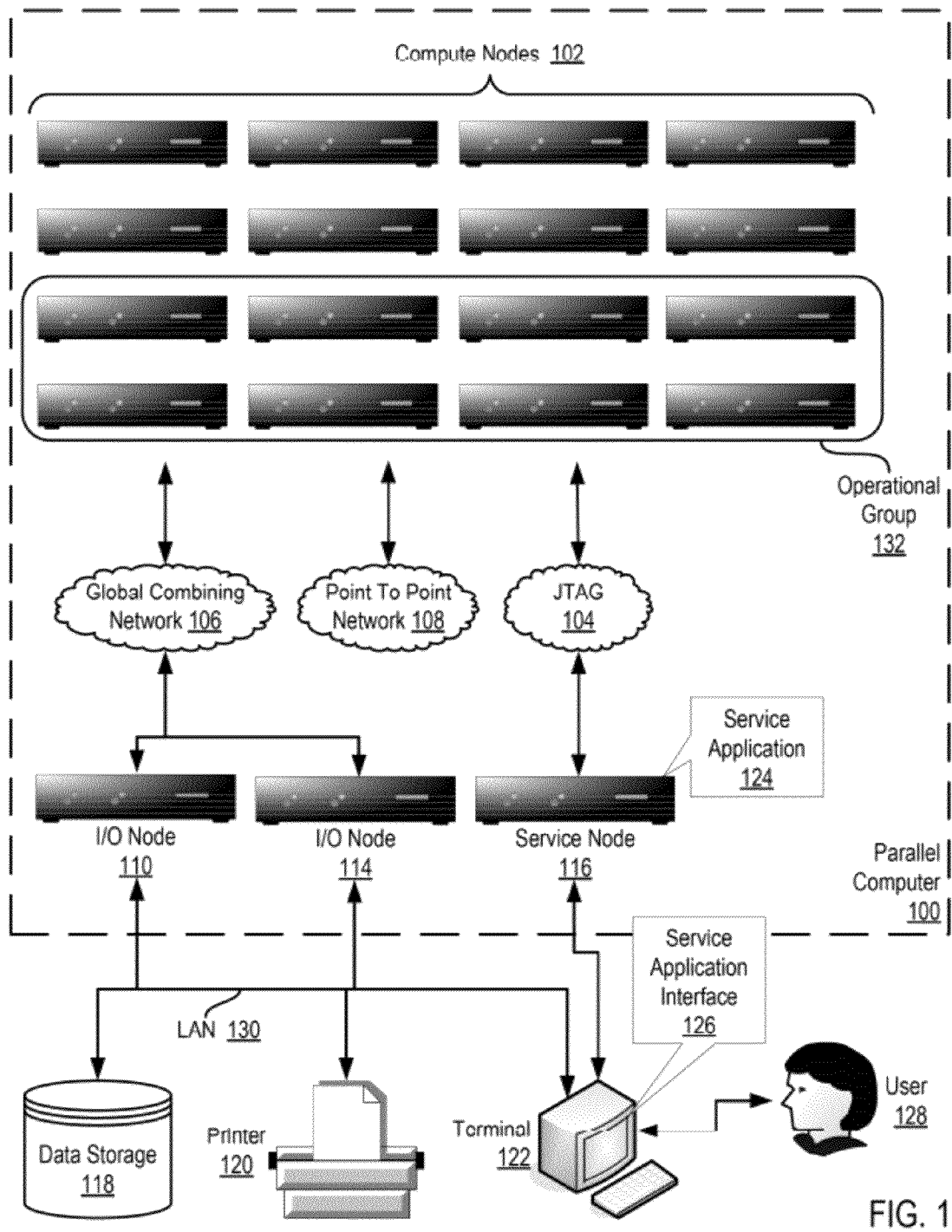
FIG. 1 illustrates an exemplary parallel computer for performing an all-to-all exchange on n number of data buffers using XOR swap operations according to embodiments of the present invention.

Exemplary methods, apparatus, and computer program products for performing an all-to-all exchange on n number of data buffers using XOR swap operations according to embodiments of the present invention are described with reference to the accompanying drawings, beginning with FIG. 1. FIG. 1 illustrates an exemplary parallel computer for performing an all-to-all exchange on n number of data buffers using XOR swap operations according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102) for executing an application that processes application data.

Each compute node (102) of FIG. 1 may include a plurality of processors for use in executing an application on the parallel computer (100) according to embodiments of the present invention. The processors of each compute node (102) in FIG. 1 are operatively coupled to computer memory such as, for example, random access memory ('RAM'). Each compute node (102) may operate in several distinct modes that affect the relationship among the processors and the memory on that node such as, for example, serial processing mode or parallel processing mode. The mode in which the compute nodes operate is generally set during the node's boot processes and does not change until the node reboots.

In serial processing mode, often referred to a 'virtual node mode,' the processors of a compute node operate independently of one another, and each processor has access to a partition of the node's total memory that is exclusively dedicated to that processor. For example, if a compute node has four processors and two Gigabytes (GB) of RAM, when operating in serial processing mode, each processor may process a thread independently of the other processors on that node, and each processor may access a 512 Megabyte (MB) portion of that node's total 2 GB of RAM.

In parallel processing mode, often referred to as 'symmetric multi-processing mode,' one of the processors acts as a master, and the remaining processors serve as slaves to the master processor. Each processor has access to the full range of computer memory on the compute node. Continuing with the exemplary node above having four processors and 2 GB of RAM, for example, each slave processor may cooperatively process threads spawned from the master processor, and all of the processors have access to the node's entire 2 GB of RAM.

The compute nodes (102) are coupled for data communications by several independent data communications networks including a Joint Test Action Group ('JTAG') network (104), a global combining network (106) which is optimized for collective operations, and a point to point network (108) which is optimized point to point operations. The global combining network (106) is a data communications network that includes data communications links connected to the compute nodes so as to organize the compute nodes in a tree topology. Each data communications network is implemented with network links among the compute nodes (102). Each network link includes a physical transmission pathway between two adjacent compute nodes in network topology. That is, a network link directly connects two adjacent compute nodes in the network topology without the use of any intervening nodes. The network links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*n elements of a given data type, where n is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the parallel computer (100) in FIG. 1 includes computer program instructions for performing an all-to-all exchange on n number of data buffers using XOR swap operations according to embodiments of the present invention. Each data buffer has n number of data elements. For each rank value of i and j where i is greater than j and where i is less than or equal to n, the parallel computer (100) in FIG. 1 operate generally for performing an all-to-all exchange on n number of data buffers using XOR swap operations according to embodiments of the present invention by: selecting data element i in data buffer j; selecting data element j in data buffer i; and exchanging contents of data element i in data buffer j with contents of data element j in data buffer i using an XOR swap operation.

An all-to-all exchange is an operation in which a portion of the contents of each data buffer is exchanged with a portion of the contents of each of the other buffers. The contents of the buffers are exchanged based on the rank value of each data buffer and the rank value of the data element containing the contents in each buffer. The term 'rank value' in reference to data elements and data buffers refers to a non-negative integer used to uniquely identify a particular data buffer or a particular data element of a data buffer. Consider rank values i and j. In an all-to-all exchange, the contents of data element i in data buffer j are exchanged with the contents of data element j in data buffer i. For example, the contents of the data element having a rank of 2 in a data buffer having a rank of 1 are exchanged with the contents of the data element having a rank of 1 in a data buffer having a rank of 2. The contents of the data element having a rank of 3 in a data buffer having a rank of 1 are exchanged with the contents of the data element having a rank of 1 in a data buffer having a rank of 3. The contents of the data element having a rank of 3 in a data buffer having a rank of 1 are exchanged with the contents of the data element having a rank of 1 in a data buffer having a rank of 3, and so on.

Applications executing on parallel computers such as, for example, the parallel computer (100) of FIG. 1, often utilize an all-to-all data exchange as part of a matrix transpose operation. Each buffer stored on each compute node of the parallel computer represents one of the rows of a matrix. For example, the data buffer having a rank value of one represents the first row of the matrix. The data buffer having a rank value of two represents the second row of the matrix, and so on. The data elements in each data buffer correspond to columns of the matrix. For example, the data element of each buffer having a rank value of one corresponds to the first column of the matrix. The data element of each buffer having a rank value of two corresponds to the second column of the matrix, and so on. Because each data buffer represents a row of the matrix and each data element corresponds to a column of the matrix, performing an all-to-all data exchange on the buffers essentially transposes the matrix.

Matrix transposition operations are useful in a wide variety of computational algorithms. For example, Fast Fourier Transform algorithms use matrix transpose operations to transform data specified in one domain to another domain. Fast Fourier Transform algorithms are useful because computations on data may be extremely difficult in one domain but relatively easy in another domain. Consider a Fast Fourier Transform algorithm that transforms radio signal data from the frequency domain to the time domain. Performing certain signal processing computations may be difficult in the frequency domain, but the same signal processing may be accomplished using relatively simple calculations in the time domain. Further consider a Fast Fourier Transform algorithm that transforms image data from the frequency domain to the time. Creating a low-pass filter algorithm requires an extremely difficult convolution operation in the frequency domain, but may be performed in the time domain as a mere multiplication operation.

As mentioned above, the all-to-all exchange is performed on a plurality of data buffers using an XOR swap operations. An XOR swap operation is an algorithm that uses a bitwise XOR operation to swap contents of two variables without using a temporary storage variable. The XOR swap operation differs from other swapping algorithms because these other swapping algorithms require the use of a temporary storage variable. The XOR swap operation is performed using three bitwise XOR operations in the following manner:

x:=x XOR y
y:=x XOR y
x:=x XOR y

The XOR swap operation combines the contents of variable x with the contents of variable y using a bitwise XOR operation and stores the result in variable x. The XOR swap operation then combines the contents of variable x with the contents of variable y using a bitwise XOR operation and stores the result in variable y. Then, the XOR swap operation combines the contents of variable x with the contents of variable y using a bitwise XOR operation and stores the result in variable x. After the XOR swap operation, the contents initially stored in variable x are stored in variable y, and the content initially stored in variable y are stored in variable x. Readers will note that the XOR operator is often depicted as '$\otimes$.'

Performing an all-to-all data exchange on a plurality of data buffers using XOR swap operations according to embodiments of the present invention advantageously performs an all-to-all data exchange without requiring temporary storage space for storing interim results during the all-to-all exchange. Rather, the computer memory required to perform the all-to-all exchange according to embodiments of the present invention is the computer memory used by the data buffers themselves. Reducing the computer memory required to perform an all-to-all data exchange advantageously allows each compute node to maximize utilization of its memory resources, which in turn, often enhances overall compute node performance.

The arrangement of nodes, networks, and I/O devices making up the exemplary system illustrated in FIG. 1 are for explanation only, not for limitation of the present invention. Data processing systems capable of performing an all-to-all exchange on n number of data buffers using XOR swap operations according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Performing an all-to-all exchange on n number of data buffers using XOR swap operations according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of performing an all-to-all exchange on n number of data buffers using XOR swap operations according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152).

Figure 2:
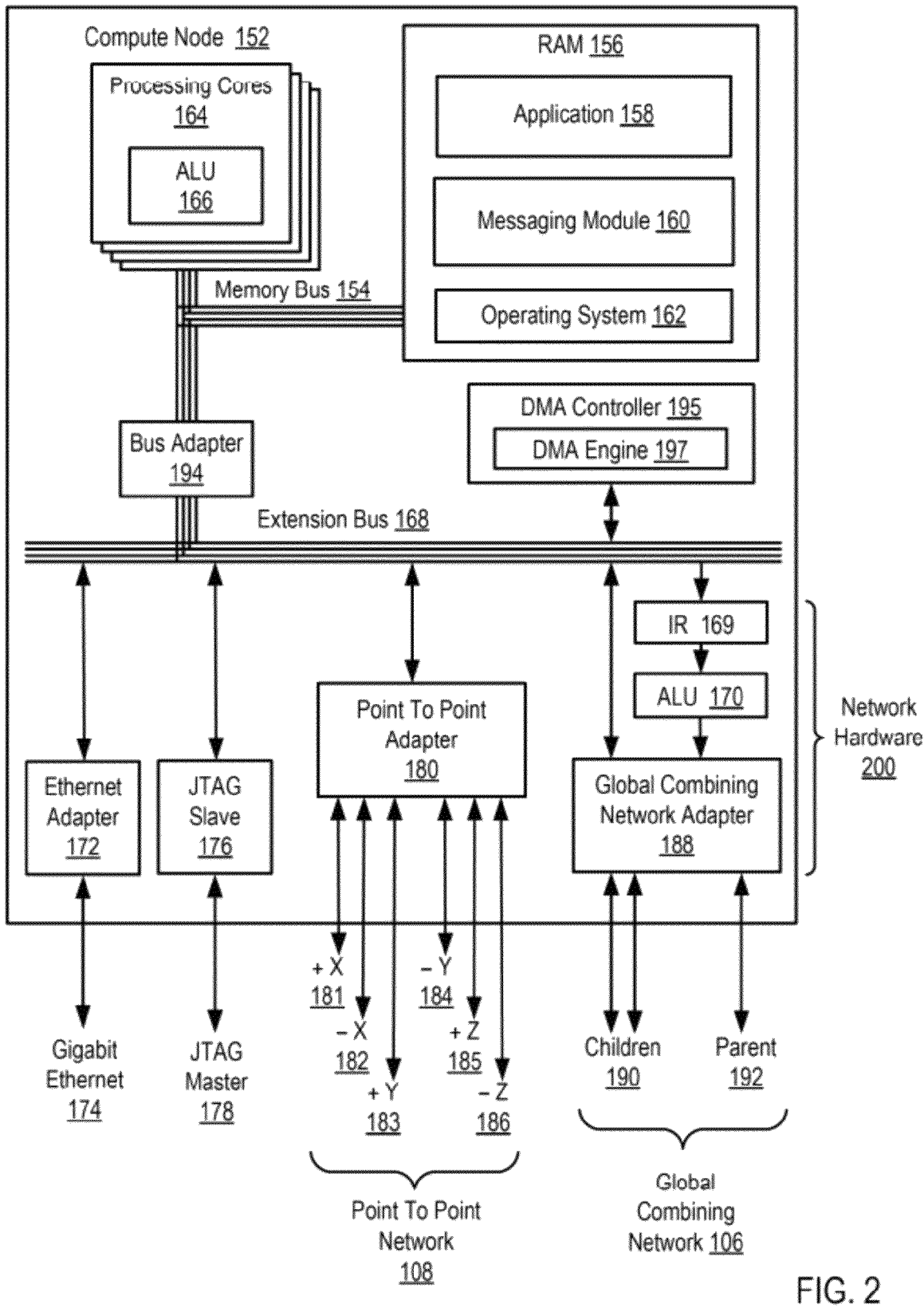
FIG. 2 sets forth a block diagram of an exemplary compute node useful in a parallel computer capable of performing an all-to-all exchange on n number of data buffers using XOR swap operations according to embodiments of the present invention.

Stored in RAM (156) of FIG. 2 is an application (158), a module of computer program instructions that carries out parallel, user-level data processing using parallel algorithms. The application (158) of FIG. 2 includes computer program instructions invoking an all-to-all exchange for n number of data buffers using XOR swap operations according to embodiments of the present invention. The application (158) may invoke the all-to-all exchange using a function of an application programming interface ('API') exposed by a messaging module (160) for inter-node communications.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

The messaging module (160) of FIG. 2, together with messaging modules installed on other compute nodes, includes computer program instructions for performing an all-to-all exchange on n number of data buffers using XOR swap operations according to embodiments of the present invention. Each data buffer has n number of data elements and is stored on a distinct compute node of the parallel computer. For each rank value of i and j where i is greater than j and where i is less than or equal to n, the parallel computer (100) in FIG. 1 operate generally for performing an all-to-all exchange on n number of data buffers using XOR swap operations according to embodiments of the present invention by: selecting data element i in data buffer j; selecting data element j in data buffer i; and exchanging contents of data element i in data buffer j with contents of data element j in data buffer i using an XOR swap operation.

The messaging modules may exchange contents of data element i in data buffer j with contents of data element j in data buffer i using an XOR swap operation by performing a series of bitwise XOR allreduce operations through the global combining network (106) in which the compute node storing data buffer j contributes the contents of data element i and the compute node storing data buffer i contributes the contents of data element j. For each exchange, the messaging modules typically perform three bitwise XOR allreduce operations to realize the XOR swap operation. Because only the compute nodes storing data buffer i and data buffer j are exchanging data during the XOR swap operation, the messaging modules of the compute nodes other than the compute nodes storing data buffer i and data buffer j may contribute the identity value to the series of bitwise XOR allreduce operations. The identity value for a bitwise XOR allreduce operation is zero for each bit involved in the operation.

To reduce the time involved in performing the series of bitwise XOR allreduce operations, the messaging modules may offload performance of each bitwise XOR allreduce operation to network hardware (200) of each compute node. The network hardware of each compute node is specialized hardware components that serve as an interface between a compute node's main processing cores and the network. The network hardware may include network adapters or auxiliary network adapter components such as, for example, dedicated network arithmetic logic units ('ALUs'). The network hardware (200) of FIG. 2, together with the network hardware of the other compute nodes, may perform the series of bitwise XOR allreduce operations by combining contributions of the compute nodes participating in the bitwise XOR allreduce operation using a bitwise XOR operator.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for performing an all-to-all exchange on n number of data buffers using XOR swap operations according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in performing an all-to-all exchange on n number of data buffers using XOR swap operations according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
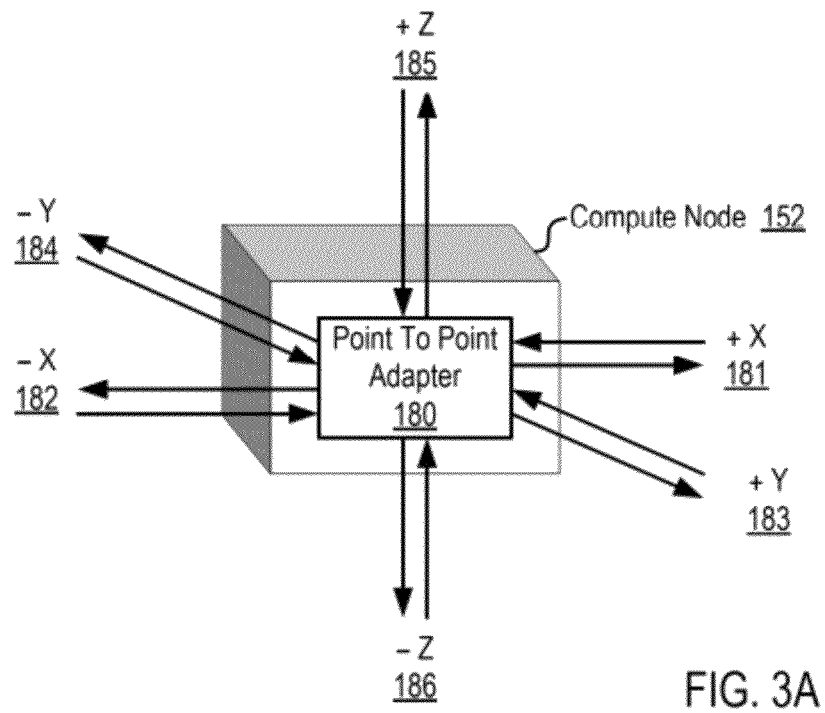
FIG. 3A illustrates an exemplary Point To Point Adapter useful in a parallel computer capable of performing an all-to-all exchange on n number of data buffers using XOR swap operations according to embodiments of the present invention.

For further explanation, FIG. 3A illustrates an exemplary Point To Point Adapter (180) useful in a parallel computer capable of performing an all-to-all exchange on n number of data buffers using XOR swap operations according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
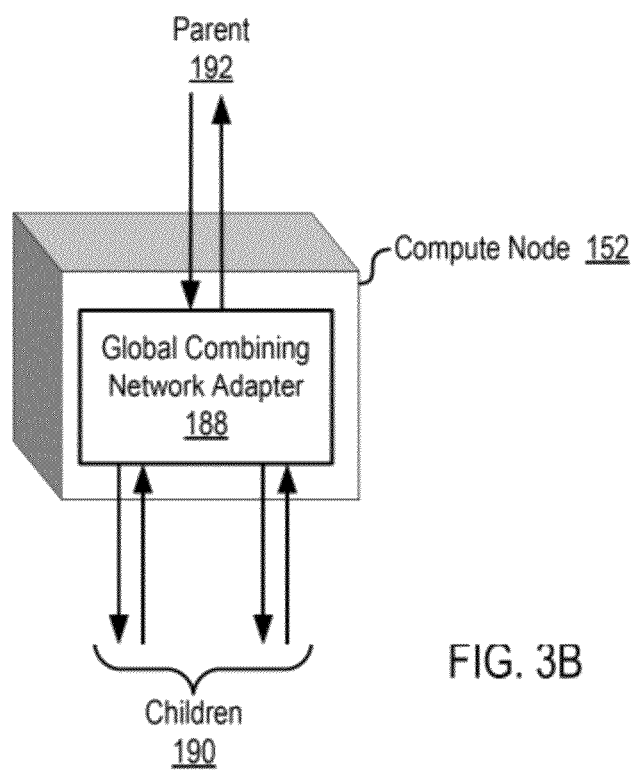
FIG. 3B illustrates an exemplary Global Combining Network Adapter useful in a parallel computer capable of performing an all-to-all exchange on n number of data buffers using XOR swap operations according to embodiments of the present invention.

For further explanation, FIG. 3B illustrates an exemplary Global Combining Network Adapter (188) useful in a parallel computer capable of performing an all-to-all exchange on n number of data buffers using XOR swap operations according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link form from two unidirectional data communications paths.

Figure 4:
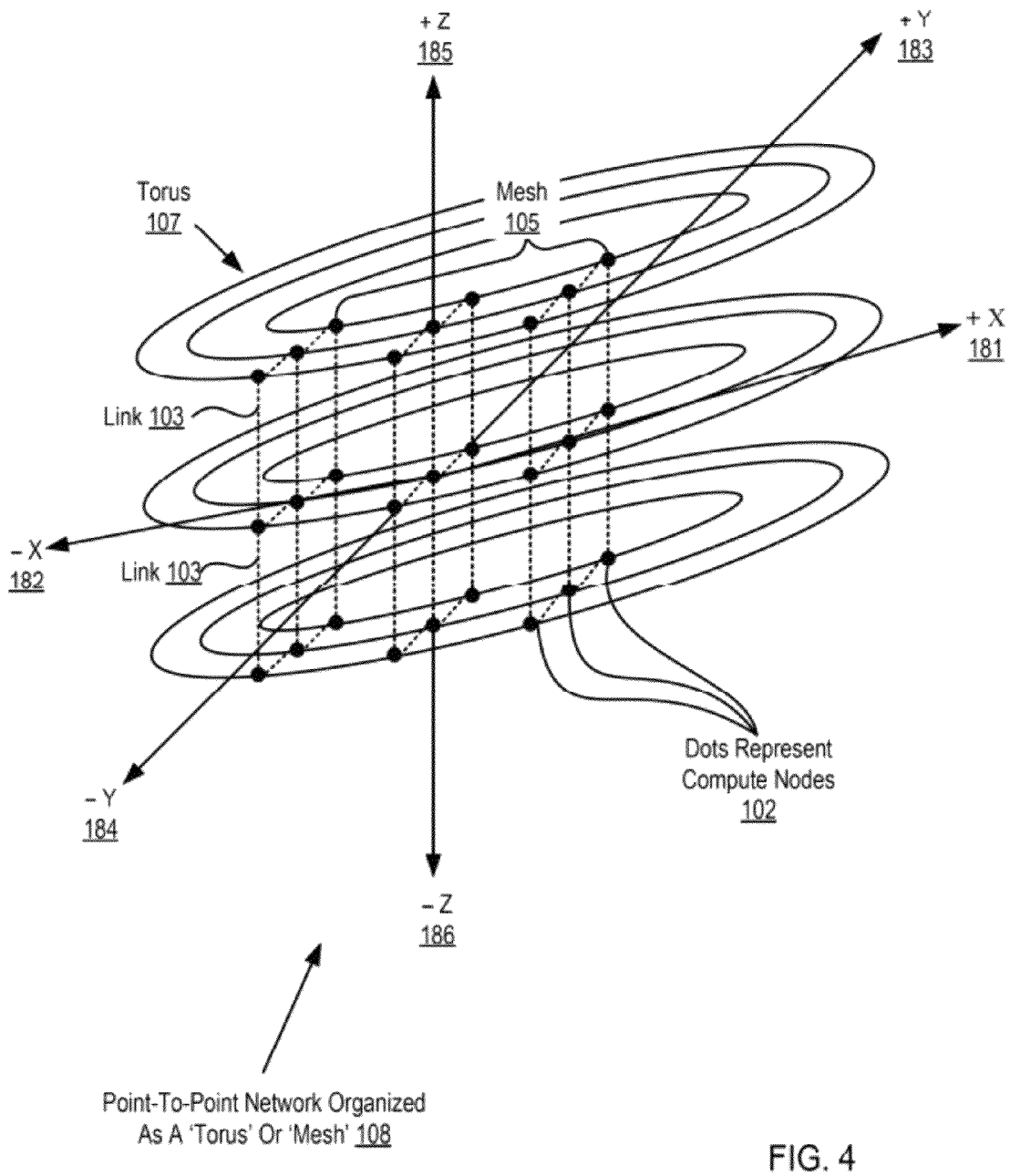
FIG. 4 sets forth a line drawing illustrating an exemplary data communications network optimized for point to point operations useful in a parallel computer capable of performing an all-to-all exchange on n number of data buffers using XOR swap operations according to embodiments of the present invention.

For further explanation, FIG. 4 sets forth a line drawing illustrating an exemplary data communications network (108) optimized for point to point operations useful in a parallel computer capable of performing an all-to-all exchange on n number of data buffers using XOR swap operations in accordance with embodiments of the present invention. In the example of FIG. 4, dots represent compute nodes (102) of a parallel computer, and the dotted lines between the dots represent network links (103) between compute nodes. The network links are implemented with point to point data communications adapters similar to the one illustrated for example in FIG. 3A, with network links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in performing an all-to-all exchange on n number of data buffers using XOR swap operations in accordance with embodiments of the present invention may contain only a few compute nodes or may contain thousands of compute nodes.

Figure 5:
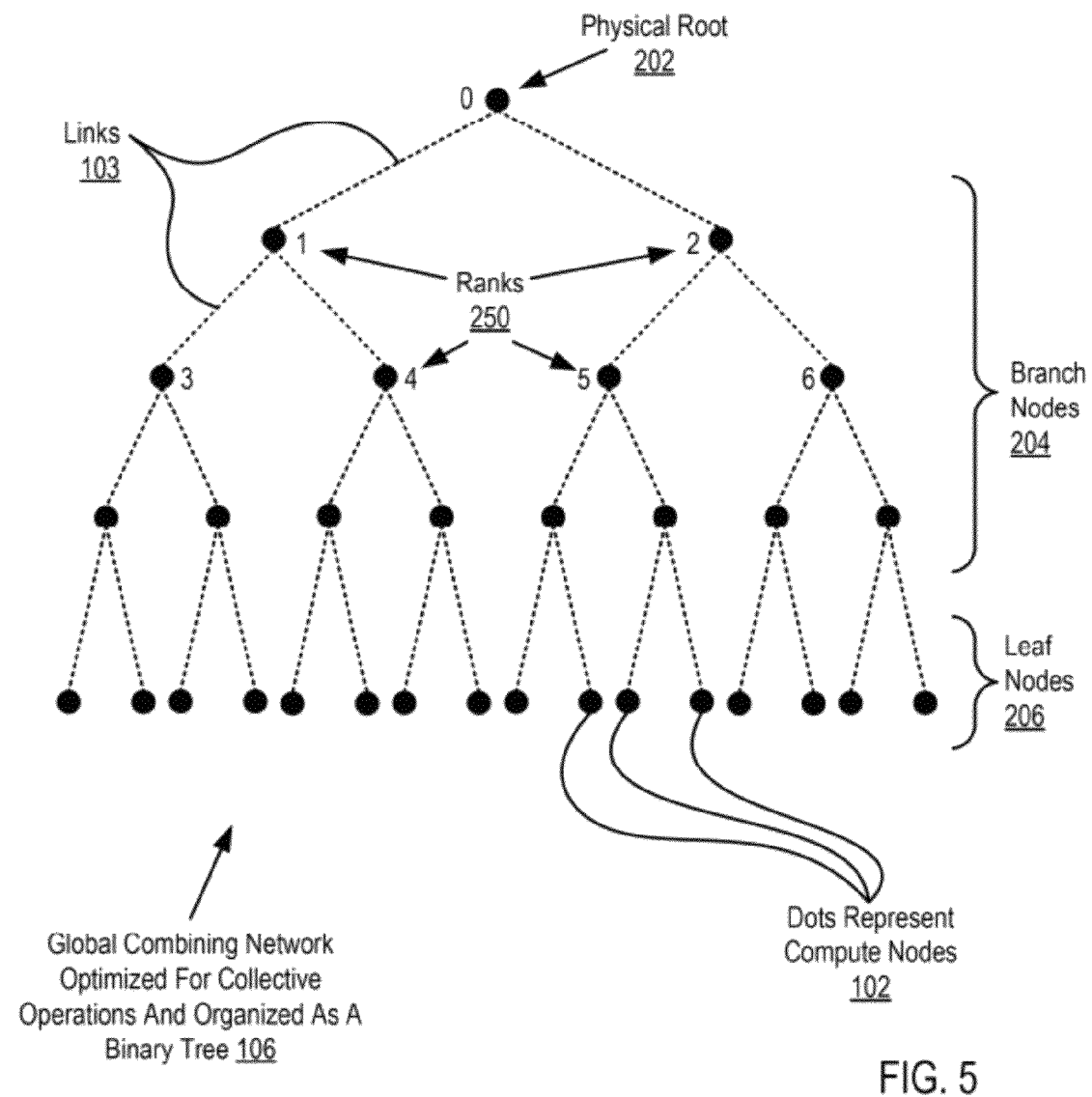
FIG. 5 sets forth a line drawing illustrating an exemplary data communications network optimized for collective operations useful in a parallel computer capable of performing an all-to-all exchange on n number of data buffers using XOR swap operations according to embodiments of the present invention.

For further explanation, FIG. 5 sets forth a line drawing illustrating an exemplary data communications network (106) optimized for collective operations useful in a parallel computer capable of performing an all-to-all exchange on n number of data buffers using XOR swap operations in accordance with embodiments of the present invention. The example data communications network of FIG. 5 includes network links connected to the compute nodes so as to organize the compute nodes as a tree. In the example of FIG. 5, dots represent compute nodes (102) of a parallel computer, and the dotted lines (103) between the dots represent network links between compute nodes. The network links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for performing an all-to-all exchange on n number of data buffers using XOR swap operations in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

For further explanation, FIG. 6A sets forth a line drawing illustrating four exemplary data buffers before performing an all-to-all exchange on n number of data buffers using XOR swap operations according to embodiments the present invention. In the example of FIG. 6A, n has a value of four because FIG. 6A includes four data buffers—data buffer 1, data buffer 2, data buffer 3, and data buffer 4. Each data buffer has four data elements—data element 1, data element 2, data element 3, and data element 4. Data buffer 1 stores a value of 'A' in data element 1, a value of 'B' in data element 2, a value of 'C' in data element 3, and a value of 'D' in data element 4. Data buffer 2 stores a value of 'E' in data element 1, a value of 'F' in data element 2, a value of 'G' in data element 3, and a value of 'H' in data element 4. Data buffer 3 stores a value of 'I' in data element 1, a value of 'J' in data element 2, a value of 'K' in data element 3, and a value of 'L' in data element 4. Data buffer 4 stores a value of 'M' in data element 1, a value of 'N' in data element 2, a value of 'O' in data element 3, and a value of 'P' in data element 4.

FIG. 6B sets forth a line drawing that illustrates the four exemplary data buffers of FIG. 6A after performing an all-to-all exchange on the four exemplary data buffers of FIG. 6A using XOR swap operations according to embodiments the present invention. In the example of FIG. 6B, each data buffer has four data elements. For each rank value of i and j where i is greater than j and where i is less than or equal to n, the all-to-all exchange is performed by: selecting data element i in data buffer j; selecting data element j in data buffer i; and exchanging contents of data element i in data buffer j with contents of data element j in data buffer i using an XOR swap operation. After performing an all-to-all exchange on the four exemplary data buffers 1-4 using XOR swap operations according to embodiments the present invention, data buffer 1 contains a value of 'A' in data element 1, a value of 'E' in data element 2, a value of 'I' in data element 3, and a value of 'M' in data element 4. Data buffer 2 contains a value of 'B' in data element 1, a value of 'F' in data element 2, a value of 'J' in data element 3, and a value of 'N' in data element 4. Data buffer 3 contains a value of 'C' in data element 1, a value of 'G' in data element 2, a value of 'K' in data element 3, and a value of 'O' in data element 4. Data buffer 4 contains a value of 'D' in data element 1, a value of 'H' in data element 2, a value of 'L' in data element 3, and a value of 'P' in data element 4.

FIGS. 6A and 6B illustrate the contents of four exemplary buffers before and after performing an all-to-all exchange on four exemplary data buffers using XOR swap operations according to embodiments the present invention. FIGS. 7A-7F illustrate iterative steps carried out while performing an all-to-all exchange on the four exemplary data buffers of FIG. 6A using XOR swap operations according to embodiments the present invention for all possible rank values of i and j when n is four. The possible rank values of i and j when n is four where i is greater than j and where i is less than or equal to n is illustrated in the following table:

TABLE 1

| i | j |
|---|---|
| 2 | 1 |
| 3 | 1 |
| 4 | 1 |
| 3 | 2 |
| 4 | 2 |
| 4 | 3 |

Turning now to FIG. 7A, FIG. 7A sets forth a line drawing that illustrates the four exemplary data buffers of FIG. 6A after performing an all-to-all exchange on the four exemplary data buffers of FIG. 6A using XOR swap operations according to embodiments the present invention when rank values of i and j are two and one, respectively. In the example of FIG. 7A, the data elements having the same contents as illustrated in FIG. 6A are depicted with a grey background. The content of data element 2 in data buffer 1 and the contents in data element 1 in data buffer 2, however, are exchanged while performing an all-to-all exchange on the four exemplary data buffers of FIG. 6A using XOR swap operations according to embodiments the present invention when rank values of i and j are two and one, respectively.

FIG. 7B sets forth a line drawing that illustrates the four exemplary data buffers of FIG. 7A after performing an all-to-all exchange on the four exemplary data buffers of FIG. 7A using XOR swap operations according to embodiments the present invention when rank values of i and j are three and one, respectively. In the example of FIG. 7B, the data elements having the same contents as illustrated in FIG. 7A are depicted with a grey background. The content of data element 3 in data buffer 1 and the contents in data element 1 in data buffer 3, however, are exchanged while performing an all-to-all exchange on the four exemplary data buffers of FIG. 7A using XOR swap operations according to embodiments the present invention when rank values of i and j are three and one, respectively.

FIG. 7C sets forth a line drawing that illustrates the four exemplary data buffers of FIG. 7B after performing an all-to-all exchange on the four exemplary data buffers of FIG. 7B using XOR swap operations according to embodiments the present invention when rank values of i and j are four and one, respectively. In the example of FIG. 7C, the data elements having the same contents as illustrated in FIG. 7B are depicted with a grey background. The content of data element 4 in data buffer 1 and the contents in data element 1 in data buffer 4, however, are exchanged while performing an all-to-all exchange on the four exemplary data buffers of FIG. 7B using XOR swap operations according to embodiments the present invention when rank values of i and j are four and one, respectively.

FIG. 7D sets forth a line drawing that illustrates the four exemplary data buffers of FIG. 7C after performing an all-to-all exchange on the four exemplary data buffers of FIG. 7C using XOR swap operations according to embodiments the present invention when rank values of i and j are three and two, respectively. In the example of FIG. 7D, the data elements having the same contents as illustrated in FIG. 7C are depicted with a grey background. The content of data element 3 in data buffer 2 and the contents in data element 2 in data buffer 3, however, are exchanged while performing an all-toall exchange on the four exemplary data buffers of FIG. 7C using XOR swap operations according to embodiments the present invention when rank values of i and j are three and two, respectively.

FIG. 7E sets forth a line drawing that illustrates the four exemplary data buffers of FIG. 7D after performing an all-to-all exchange on the four exemplary data buffers of FIG. 7D using XOR swap operations according to embodiments the present invention when rank values of i and j are four and two, respectively. In the example of FIG. 7E, the data elements having the same contents as illustrated in FIG. 7D are depicted with a grey background. The content of data element 4 in data buffer 2 and the contents in data element 2 in data buffer 4, however, are exchanged while performing an all-to-all exchange on the four exemplary data buffers of FIG. 7D using XOR swap operations according to embodiments the present invention when rank values of i and j are four and two, respectively.

FIG. 7F sets forth a line drawing that illustrates the four exemplary data buffers of FIG. 7E after performing an all-to-all exchange on the four exemplary data buffers of FIG. 7E using XOR swap operations according to embodiments the present invention when rank values of i and j are four and three, respectively. In the example of FIG. 7F, the data elements having the same contents as illustrated in FIG. 7E are depicted with a grey background. The content of data element 4 in data buffer 3 and the contents in data element 3 in data buffer 4, however, are exchanged while performing an all-to-all exchange on the four exemplary data buffers of FIG. 7E using XOR swap operations according to embodiments the present invention when rank values of i and j are four and three, respectively.

As mentioned above, the compute nodes may exchange the contents of data elements using an XOR swap operation. Readers will recall that an XOR swap operation is performed using three bitwise XOR operations in the following manner:

x:=x XOR y
y:=x XOR y
x:=x XOR y

When the data buffers are stored on distinct compute nodes, the compute nodes may perform the XOR swap operation as a series of three bitwise XOR allreduce operations through the global combining network. In some embodiments, each compute node contributes a value to each bitwise XOR allreduce. The compute nodes which store the data buffers participating in a particular exchange contribute the contents of the data elements being exchanged. The compute nodes which store the buffers not participating in the exchange contribute an identity value—that is, zero.

Figure 8A:
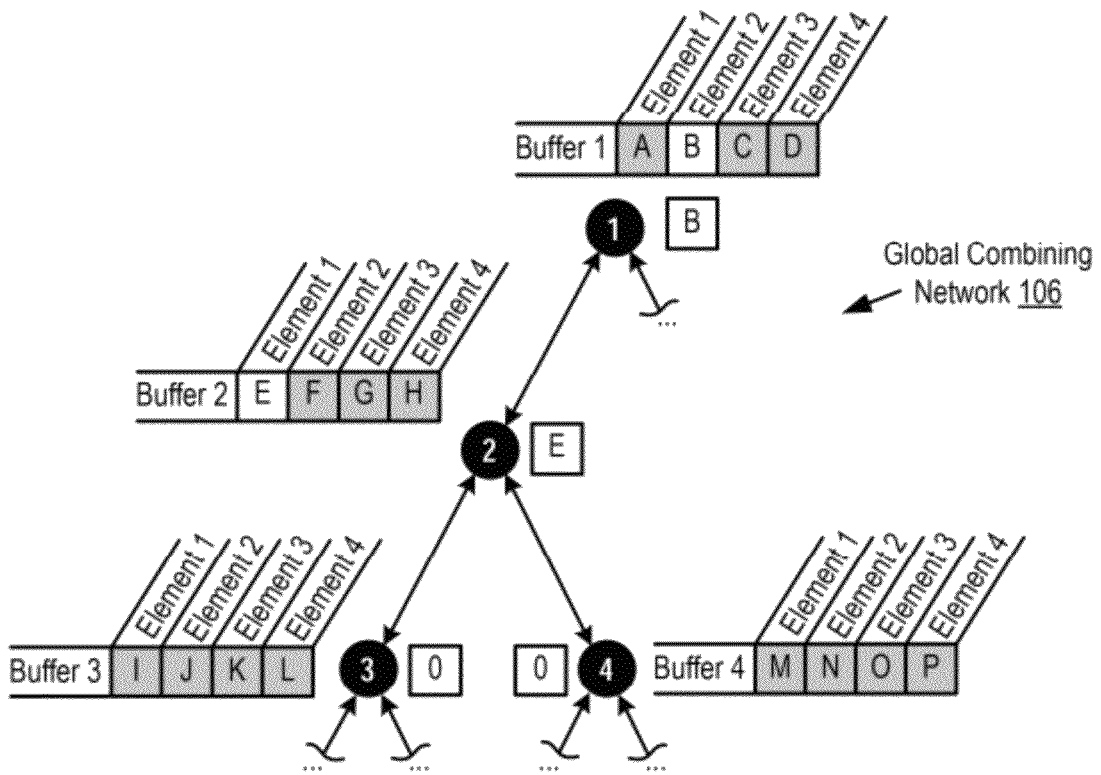
FIG. 8A sets forth a line drawing according to embodiments the present invention that illustrates exemplary contributions by each compute node for the first bitwise XOR allreduce operation performed to exchange the contents of data element 2 in data buffer 1 with the contents of data element 1 in data buffer 2 of the exemplary data buffers of FIG. 6A.

For further explanation of the contributions of each compute node and how the contents of the data buffers change during the series of bitwise XOR allreduce operations, consider the series of bitwise XOR allreduce operations performed to exchange the contents of data element 2 in data buffer 1 with the contents of data element 1 in data buffer 2 using the exemplary data buffers of FIG. 6A. FIG. 8A sets forth a line drawing that illustrates exemplary contributions by each compute node for the first bitwise XOR allreduce operation performed to exchange the contents of data element 2 in data buffer 1 with the contents of data element 1 in data buffer 2 of the exemplary data buffers of FIG. 6A. The exemplary data buffers illustrated in FIG. 8A are distributed among distinct compute nodes connected together for data communications using a global combining network (106). Data buffer 1 is stored on compute node 1; data buffer 2 is stored on compute node 2; data buffer 3 is stored on compute node 3; and data buffer 4 is stored on compute node 4. FIG. 8A illustrates each compute node as a circle with a black background.

In the example of FIG. 8A, compute node 1 contributes the contents "B" of data element 2 in data buffer 1 to the first bitwise XOR allreduce operation used in the XOR swap operation to exchange the contents of data element 2 in data buffer 1 with data element 1 in data buffer 2. Compute node 2 contributes the contents "E" of data element 1 in data buffer 2 to the first bitwise XOR allreduce operation used in the XOR swap operation. FIG. 8A illustrates the contributions of compute nodes 1 and 2 in the boxes adjacent to the compute nodes. Because the compute node 1 does not contribute the contents of data elements 1, 3, and 4 in data buffer 1 and because the compute node 2 does not contribute the contents of data elements 2, 3, and 4 in data buffer 2, FIG. 8A depicts those elements with a grey background.

Because only data buffer 1 and data buffer 2 are involved in the exchange, the compute nodes 3 and 4 contribute the identity value—zero—to the bitwise XOR allreduce operation. That is, compute nodes 3 and 4 do not contribute any of the contents of the data elements in data buffers 3 and 4 to the first bitwise XOR allreduce operation used in the XOR swap operation to exchange the contents of data element 2 in data buffer 1 with data element 1 in data buffer 2. FIG. 8A illustrates the contributions of compute nodes 3 and 4 in the boxes adjacent to the compute nodes. Because the compute nodes 3 and 4 do not contribute the contents of data elements in data buffers 3 and 4, FIG. 8A depicts those elements with a grey background.

In the example of FIG. 8A, the network hardware for the compute nodes combines the contributions of the compute nodes 1-4 participating in the first bitwise XOR allreduce operation of the XOR swap using a bitwise XOR operator. Specifically, network hardware of compute nodes 3 and 4 passes the identity value of zero to compute node 2. Compute node 2 then combines the contributions of the compute nodes 2, 3, and 4 using a bitwise XOR operator according to the expression "E⊕0⊕0," which simply results in "E." Compute node 2 then passes the result of "E" to compute node 1. Compute node 1 then combines its contributions with the result received from compute node 2 using a bitwise XOR operator according to the expression "B⊕E."

Figure 8B:
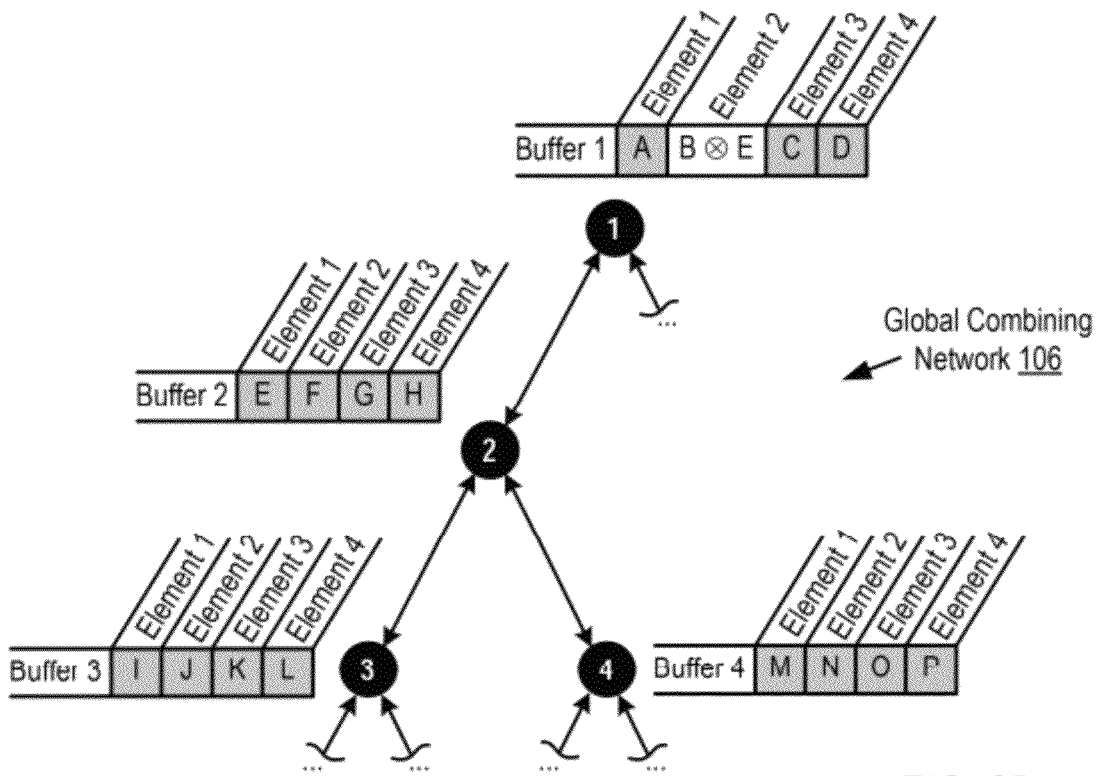
FIG. 8B sets forth a line drawing according to embodiments the present invention that illustrates contents of the exemplary data buffers after the first bitwise XOR allreduce operation is performed using the contributions illustrated in FIG. 8A.

According to the XOR swap operation algorithm above for exchanging the contents of two variables without using a temporary variable, the results of the first XOR operation are stored as contents in one of the two variables participating in the XOR swap operation. FIG. 8B sets forth a line drawing that illustrates contents of the exemplary data buffers after the first bitwise XOR allreduce operation is performed using the contributions illustrated in FIG. 8A. Readers will recall from above that the result of the first bitwise XOR allreduce operation performed using the contributions illustrated in FIG. 8A is "B⊕E." FIG. 8B illustrates that compute node 1 stores this result in data element 2 in data buffer 1. Because only the contents of data element 2 in data buffer 1 are altered during the first bitwise XOR allreduce operation, FIG. 8B depicts the remaining elements with a grey background.

Figure 8C:
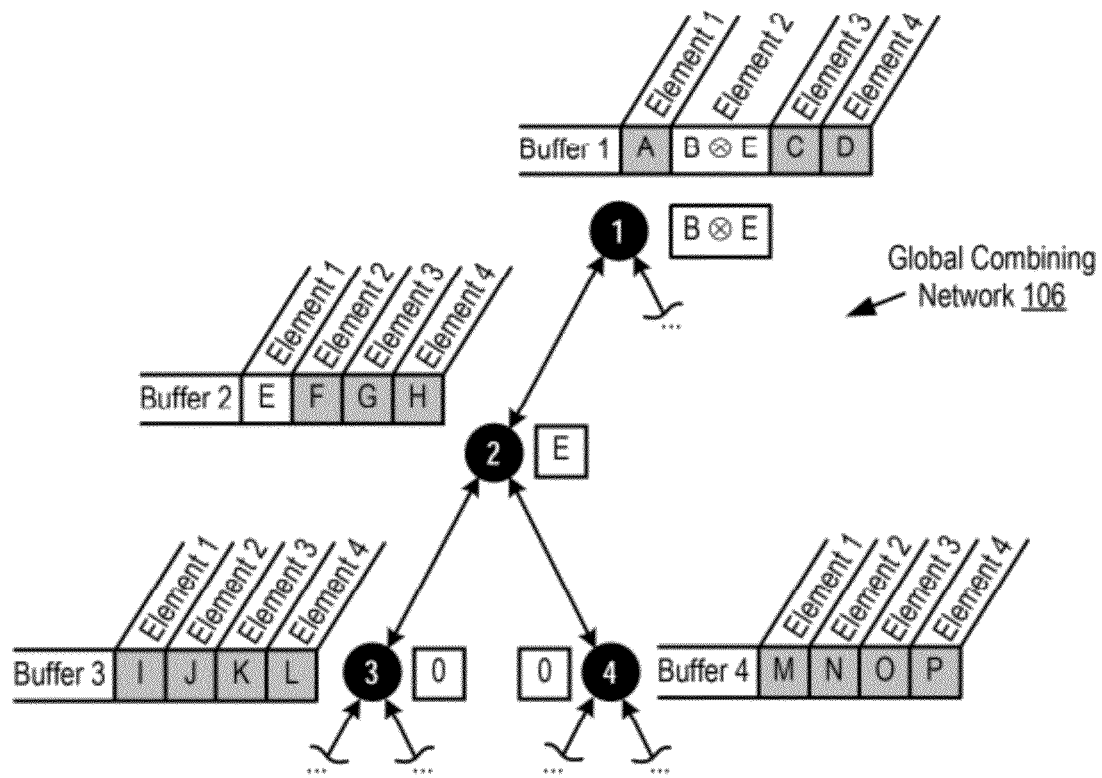
FIG. 8C sets forth a line drawing according to embodiments the present invention that illustrates exemplary contributions by each compute node for the second bitwise XOR allreduce operation performed to exchange the contents of data element 2 in data buffer 1 with the contents of data element 1 in data buffer 2 of the exemplary data buffers of FIG. 6A.

After performing the first bitwise XOR allreduce operation to exchange the contents of data element 2 in data buffer 1 with the contents of data element 1 in data buffer 2 of the exemplary data buffers of FIG. 6A, the compute nodes perform the second bitwise XOR allreduce operation as specified in the XOR swap operation algorithm above. FIG. 8C sets forth a line drawing that illustrates exemplary contributions by each compute node for the second bitwise XOR allreduce operation performed to exchange the contents of data element 2 in data buffer 1 with the contents of data element 1 in data buffer 2 of the exemplary data buffers of FIG. 6A.

In the example of FIG. 8C, compute node 1 contributes the contents of data element 2 in data buffer 1 to the second bitwise XOR allreduce operation used in the XOR swap operation—that is, compute node 1 contributes "B⊕E." Compute node 2 contributes the contents of data element 1 in data buffer 2 to the second bitwise XOR allreduce operation used in the XOR swap operation—that is, compute node 2 contributes "E." FIG. 8C illustrates the contributions of compute nodes 1 and 2 in the boxes adjacent to the compute nodes. Because the compute node 1 does not contribute the contents of data elements 1, 3, and 4 in data buffer 1 and because the compute node 2 does not contribute the contents of data elements 2, 3, and 4 in data buffer 2, FIG. 8C depicts those elements with a grey background.

Because only data buffer 1 and data buffer 2 are involved in the exchange, the compute nodes 3 and 4 contribute the identity value—zero—to the bitwise XOR allreduce operation. That is, compute nodes 3 and 4 do not contribute any of the contents of the data elements in data buffers 3 and 4 to the second bitwise XOR allreduce operation used in the XOR swap operation to exchange the contents of data element 2 in data buffer 1 with data element 1 in data buffer 2. FIG. 8C illustrates the contributions of compute nodes 3 and 4 in the boxes adjacent to the compute nodes. Because the compute nodes 3 and 4 do not contribute the contents of data elements in data buffers 3 and 4, FIG. 8C depicts those elements with a grey background.

In the example of FIG. 8C, the network hardware for the compute nodes combines the contributions of the compute nodes 1-4 participating in the second bitwise XOR allreduce operation of the XOR swap using a bitwise XOR operator. Specifically, network hardware of compute nodes 3 and 4 passes the identity value of zero to compute node 2. Compute node 2 then combines the contributions of the compute nodes 2, 3, and 4 using a bitwise XOR operator according to the expression "E⊕0⊕0," which simply results in "E." Compute node 2 then passes the result of "E" to compute node 1. Compute node 1 then combines its contributions with the result received from compute node 2 using a bitwise XOR operator according to the expression "B⊕E⊕E," which simply results in "B" because "E⊕E" is zero and "B⊕0" is merely "B."

Figure 8D:
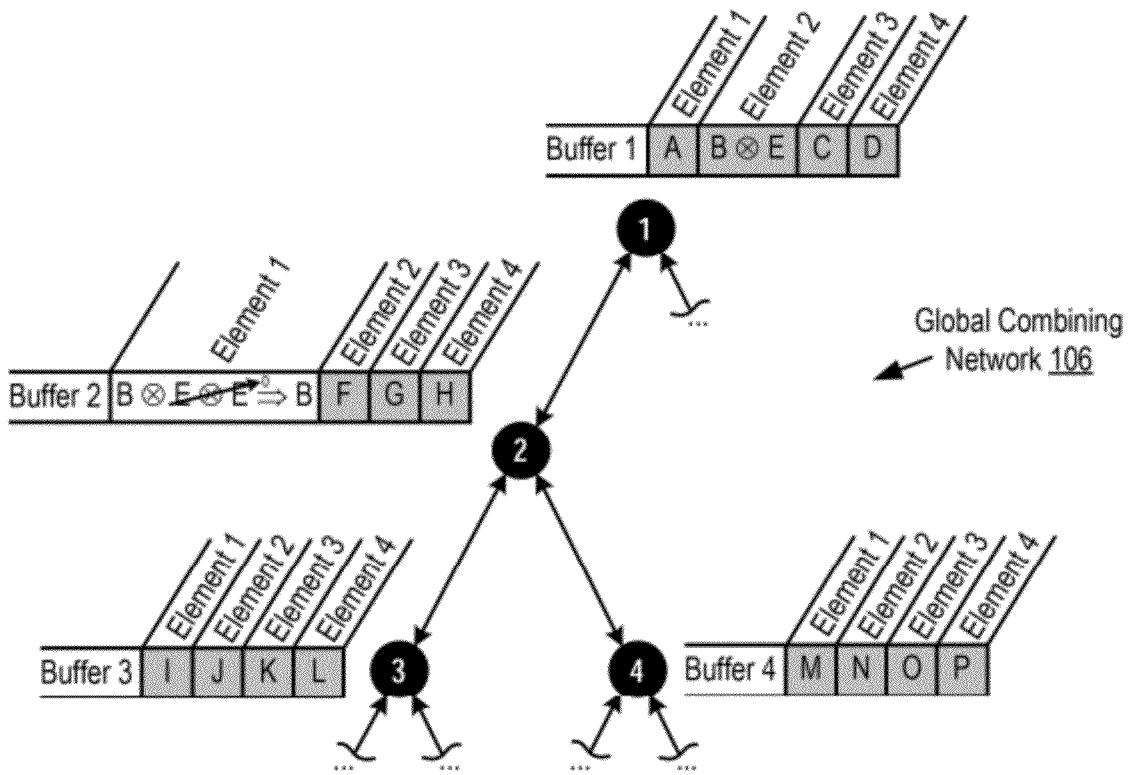
FIG. 8D sets forth a line drawing according to embodiments the present invention that illustrates contents of the exemplary data buffers after the second bitwise XOR allreduce operation is performed using the contributions illustrated in FIG. 8C.

According to the XOR swap operation algorithm above for exchanging the contents of two variables without using a temporary variable, the results of the second XOR operation are stored as contents in variable of the two variables participating in the XOR swap operation that did not store the results of the first XOR operation. FIG. 8D sets forth a line drawing that illustrates contents of the exemplary data buffers after the second bitwise XOR allreduce operation is performed using the contributions illustrated in FIG. 8C. Readers will recall from above that the result of the second bitwise XOR allreduce operation performed using the contributions illustrated in FIG. 8C is "B." FIG. 8D illustrates that compute node 2 stores this result in data element 1 in data buffer 2. Because only the contents of data element 1 in data buffer 2 are altered during the second bitwise XOR allreduce operation, FIG. 8D depicts the remaining elements with a grey background.

Figure 8E:
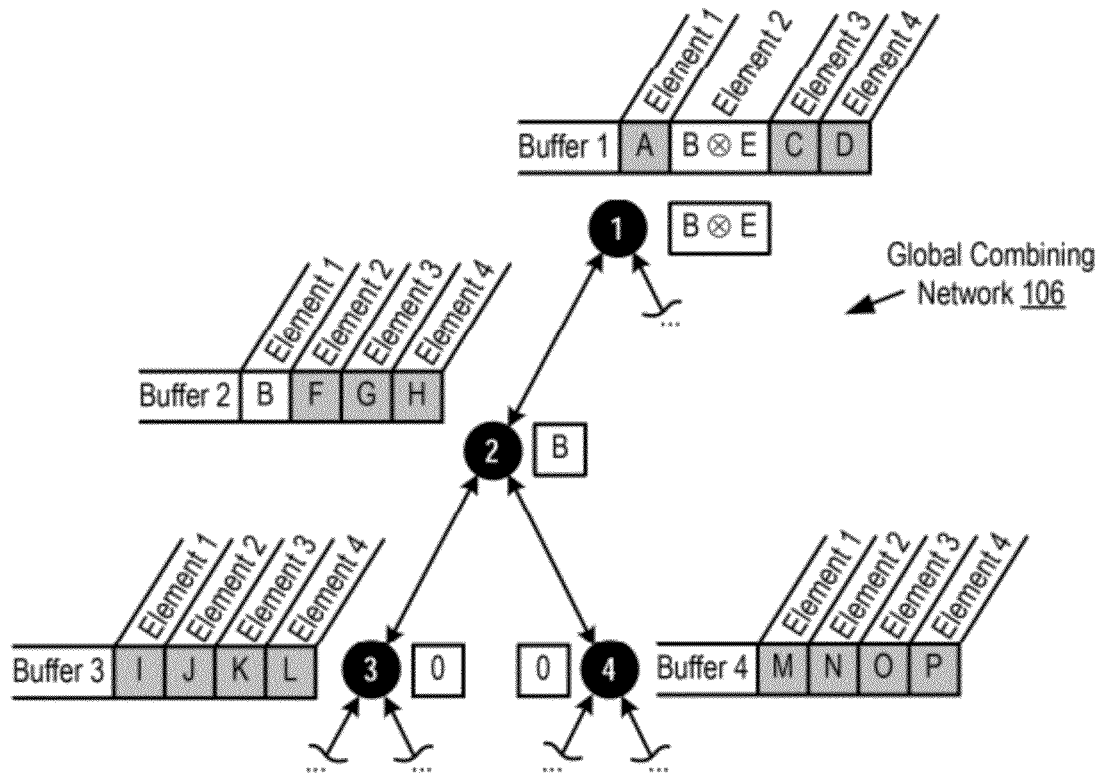
FIG. 8E sets forth a line drawing according to embodiments the present invention that illustrates exemplary contributions by each compute node for the third bitwise XOR allreduce operation performed to exchange the contents of data element 2 in data buffer 1 with the contents of data element 1 in data buffer 2 of the exemplary data buffers of FIG. 6A.

After performing the second bitwise XOR allreduce operation to exchange the contents of data element 2 in data buffer 1 with the contents of data element 1 in data buffer 2 of the exemplary data buffers of FIG. 6A, the compute nodes perform the third bitwise XOR allreduce operation as specified in the XOR swap operation algorithm above. FIG. 8E sets forth a line drawing that illustrates exemplary contributions by each compute node for the third bitwise XOR allreduce operation performed to exchange the contents of data element 2 in data buffer 1 with the contents of data element 1 in data buffer 2 of the exemplary data buffers of FIG. 6A.

In the example of FIG. 8E, compute node 1 contributes the contents of data element 2 in data buffer 1 to the third bitwise XOR allreduce operation used in the XOR swap operation—that is, compute node 1 contributes "B⊕E." Compute node 2 contributes the contents of data element 1 in data buffer 2 to the third bitwise XOR allreduce operation used in the XOR swap operation—that is, compute node 2 contributes "B." FIG. 8E illustrates the contributions of compute nodes 1 and 2 in the boxes adjacent to the compute nodes. Because the compute node 1 does not contribute the contents of data elements 1, 3, and 4 in data buffer 1 and because the compute node 2 does not contribute the contents of data elements 2, 3, and 4 in data buffer 2, FIG. 8E depicts those elements with a grey background.

Because only data buffer 1 and data buffer 2 are involved in the exchange, the compute nodes 3 and 4 contribute the identity value—zero—to the bitwise XOR allreduce operation. That is, compute nodes 3 and 4 do not contribute any of the contents of the data elements in data buffers 3 and 4 to the third bitwise XOR allreduce operation used in the XOR swap operation to exchange the contents of data element 2 in data buffer 1 with data element 1 in data buffer 2. FIG. 8E illustrates the contributions of compute nodes 3 and 4 in the boxes adjacent to the compute nodes. Because the compute nodes 3 and 4 do not contribute the contents of data elements in data buffers 3 and 4, FIG. 8E depicts those elements with a grey background.

In the example of FIG. 8E, the network hardware for the compute nodes combines the contributions of the compute nodes 1-4 participating in the third bitwise XOR allreduce operation of the XOR swap using a bitwise XOR operator. Specifically, network hardware of compute nodes 3 and 4 passes the identity value of zero to compute node 2. Compute node 2 then combines the contributions of the compute nodes 2, 3, and 4 using a bitwise XOR operator according to the expression "B⊕0⊕0," which simply results in "B." Compute node 2 then passes the result of "B" to compute node 1. Compute node 1 then combines its contributions with the result received from compute node 2 using a bitwise XOR operator according to the expression "B⊕B⊕E," which simply results in "E" because "B⊕B" is zero and "E⊕0" is merely "E."

Figure 8F:
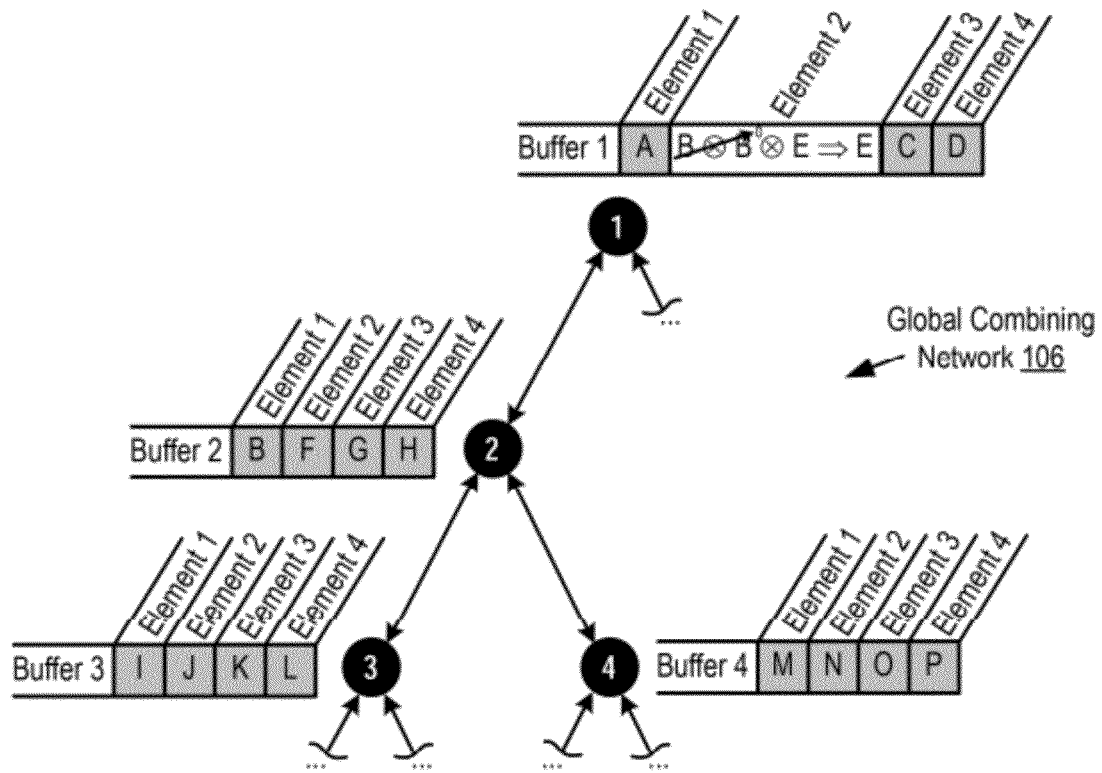
FIG. 8F sets forth a line drawing according to embodiments the present invention that illustrates contents of the exemplary data buffers after the third bitwise XOR allreduce operation is performed using the contributions illustrated in FIG. 8E.

According to the XOR swap operation algorithm above for exchanging the contents of two variables without using a temporary variable, the results of the third XOR operation are stored as contents in variable of the two variables participating in the XOR swap operation that stored the results of the first XOR operation. FIG. 8F sets forth a line drawing that illustrates contents of the exemplary data buffers after the third bitwise XOR allreduce operation is performed using the contributions illustrated in FIG. 8E. Readers will recall from above that the result of the third bitwise XOR allreduce operation performed using the contributions illustrated in FIG. 8E is "E." FIG. 8D illustrates that compute node 1 stores this result in data element 2 in data buffer 1. Because only the contents of data element 2 in data buffer 1 are altered during the third bitwise XOR allreduce operation, FIG. 8F depicts the remaining elements with a grey background.

FIGS. 8A-8F illustrate the contributions of the compute nodes and the manner in which the contents of the data buffers change as the compute nodes exchange the contents of data element 2 in data buffer 1 with contents of data element 1 in data buffer 2 using an XOR swap operation. That is, FIGS.

8A-8F illustrate the contributions of the compute nodes and the manner in which the contents of the data buffers change as the compute nodes exchange the contents of data elements in data buffers when the rank value of i is 2 and the rank value of j is 1. Readers will note, however, that the contributions of the compute nodes and the contents of the data buffers also change in a similar manner for other rank values of i and j where i is greater than j and where i is less than or equal to n. Recall that n is the number of data buffers involved in the all-to-all exchange and the number of data elements in each data buffer.

Figure 9:
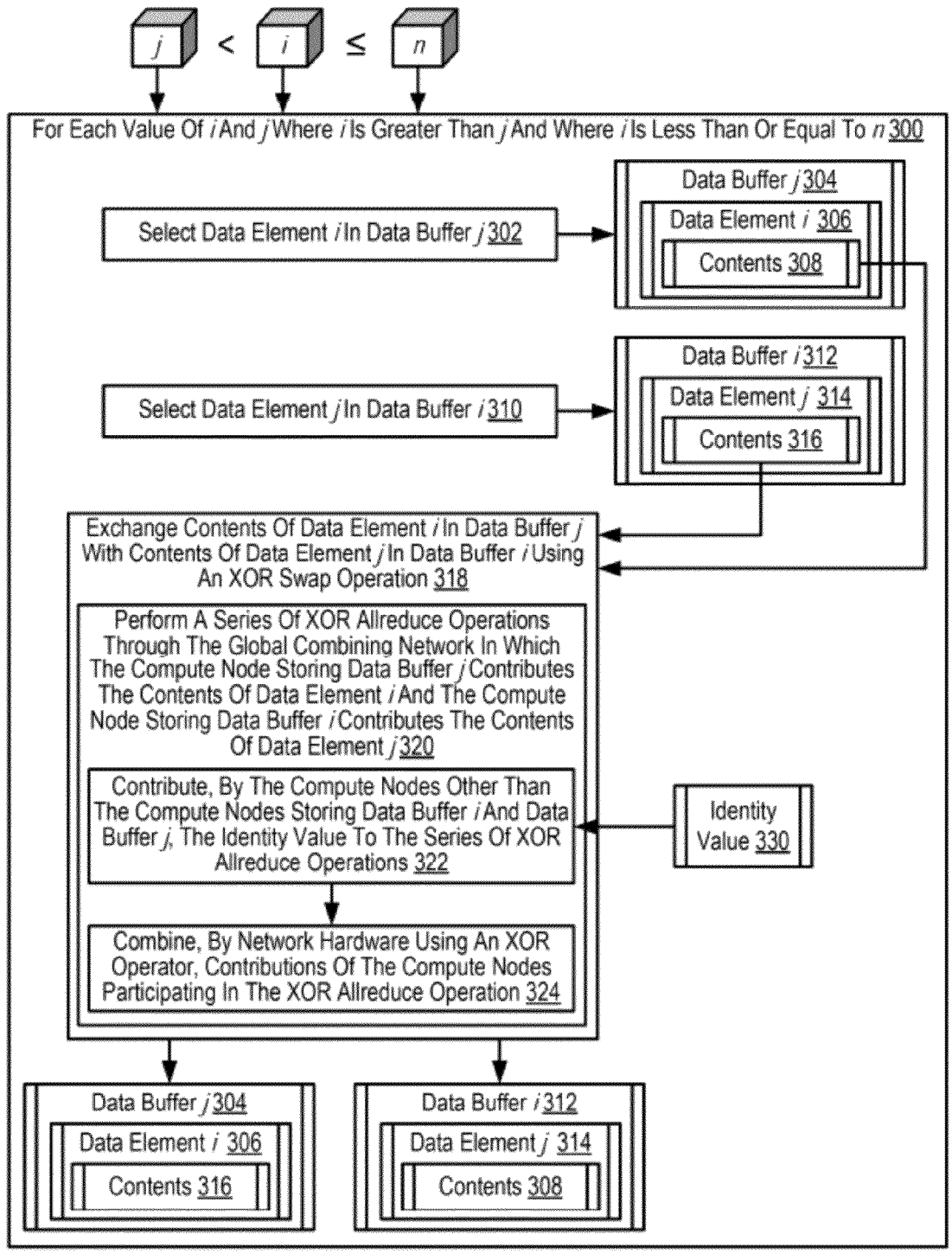
FIG. 9 sets forth a flow chart illustrating an exemplary method for performing an all-to-all exchange on n number of data buffers using XOR swap operations according to embodiments the present invention.

For further explanation, FIG. 9 sets forth a flow chart illustrating an exemplary method for performing an all-to-all exchange on n number of data buffers using XOR swap operations according to embodiments the present invention. Each data buffer has n number of data elements, and each data buffer described with reference to FIG. 9 is stored on a distinct compute node of a parallel computer. The compute nodes are connected together using a global combining network optimized for collective operations.

The data buffers and data elements involved in performing an all-to-all exchange according to the method of FIG. 9 are specified using rank values of i and j. As mentioned above, the term 'rank value' refers to a non-negative integer used to uniquely identify a particular data buffer or a particular data element of a data buffer. The method of FIG. 9 performs an all-to-all exchange on n number of data buffers using rank values of i and j where i is greater than j and where i is less than or equal to n.

For (300) each rank value of i and j where i is greater than j and where i is less than or equal to n, the method of FIG. 9 includes:
  selecting (302) data element i (306) in data buffer j (304);
  selecting (310) data element j (314) in data buffer i (312); and
  exchanging (318) contents (308) of data element i (306) in data buffer j (304) with contents (316) of data element j (314) in data buffer i (312) using an XOR swap operation.

In the method of FIG. 9, exchanging (318) contents (308) of data element i (306) in data buffer j (304) with contents (316) of data element j (314) in data buffer i (312) using an XOR swap operation includes performing (320) a series of bitwise XOR allreduce operations through the global combining network in which the compute node storing data buffer j (304) contributes the contents (308) of data element i (306) and the compute node storing data buffer i (312) contributes the contents (316) of data element j (314). Because an XOR swap operation requires at least three XOR operations, the minimum number of bitwise XOR allreduce operations performed in the series of bitwise XOR allreduce operations is typically three as well. Although readers will recognize that other numbers of bitwise XOR allreduce operations may be performed in a series of bitwise XOR allreduce operations used to exchange the (318) contents (308) of data element i (306) in data buffer j (304) with contents (316) of data element j (314) in data buffer i (312) using an XOR swap operation.

Performing (320) a series of bitwise XOR allreduce operations according to the method of FIG. 9 includes contributing (322), by the compute nodes other than the compute nodes storing data buffer i (312) and data buffer j (304), the identity value (330) to the series of bitwise XOR allreduce operations. As mentioned above, the identity value (330) for an XOR operation is zero because "x$\oplus$0" is merely "x."

In the method of FIG. 9, performing (320) a series of bitwise XOR allreduce operations may be carried out using network hardware that combines (324) the contributions of the compute nodes participating in the bitwise XOR allreduce operation using a bitwise XOR operator. Using network hardware to perform a bitwise XOR allreduce operation generally refers to the network hardware's ability to combine multiple contributions from compute nodes using an XOR operation without utilizing the compute nodes' main processing cores. That is, once the processing cores inject each compute nodes' contribution into its respective network hardware, the network hardware of the compute nodes then combines the multiple contributions using an XOR operation without involving the processing cores. To avoid involving the processing cores during each bitwise XOR allreduce operation, the network hardware of each compute node typically includes an arithmetic logic unit distinct from the node's processing core. This arithmetic logic unit is capable of combining contributions using XOR operation without involving the node's processing core. Using network hardware to performing each bitwise XOR allreduce operation with out involving the node's processing core typically enhances the overall performance of an all-to-all exchange on n number of data buffers using XOR swap operations according to embodiments of the present invention.

Exemplary embodiments of the present invention are described largely in the context of a fully functional parallel computer system for performing an all-to-all exchange on n number of data buffers using XOR swap operations. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of performing an all-to-all exchange on n number of data buffers stored in computer memory using computer-implemented swap operations, each data buffer having n number of data elements, each data buffer stored on a distinct compute node of a parallel computer, the compute nodes connected together with a global combining network, the method comprising, for each rank value of i and j where i is greater than j and where i is less than or equal to n:

exchanging, by the module of automated computing machinery and without user intervention, contents of data element i in data buffer j with contents of a data element j in data buffer i using a computer-implemented swap operation, including: performing a series of bitwise XOR allreduce operations through the global combining network in which the compute node storing data buffer j contributes the contents of data element i and the compute node storing data buffer i contributes the contents of data element j, and combining, by network hardware using a bitwise XOR operator, contributions of the compute nodes participating in the bitwise XOR allreduce operation.

2. The method of claim 1 wherein performing the series of bitwise XOR allreduce operations further comprises contributing, by the compute nodes other than the compute nodes storing data buffer i and data buffer j, the identity value to the series of bitwise XOR allreduce operations.

3. The method of claim 1 wherein the compute nodes are connected together for data communications using a plurality of data communications networks, at least one of the networks optimized for collective operations, and at least one of the data communications networks optimized for point to point operations.

4. An apparatus for performing an all-to-all exchange on n number of data buffers using swap operations, each data buffer having n number of data elements, each data buffer stored on a distinct compute node of a parallel computer, the compute nodes connected together with a global combining network, the apparatus comprising:

one or more computer processors and computer memory operatively coupled to the computer processors, the computer memory having disposed within it computer program instructions, the computer processor executing the computer program instructions, causing the apparatus to carry out the steps of:

for each rank value of i and j where i is greater than j and where i is less than or equal to n:

exchanging contents of data element i in data buffer j with contents of data element j in data buffer i using a swap operation including: performing a series of bitwise XOR allreduce operations through the global combining network in which the compute node storing data buffer j contributes the contents of data element i and the compute node storing data buffer i contributes the contents of data element j, and combining, by network hardware using a bitwise XOR operator, contributions of the compute nodes participating in the bitwise XOR allreduce operation.

5. The apparatus of claim 4 wherein performing the series of bitwise XOR allreduce operations further comprises contributing, by the compute nodes other than the compute nodes storing data buffer i and data buffer j, the identity value to the series of bitwise XOR allreduce operations.

6. The apparatus of claim 4 wherein the compute nodes are connected together for data communications using a plurality of data communications networks, at least one of the networks optimized for collective operations, and at least one of the data communications networks optimized for point to point operations.

7. A computer program product for performing an all-to-all exchange on n number of data buffers using XOR swap operations, each data buffer having n number of data elements, each data buffer stored on a distinct compute node of a parallel computer, the compute nodes connected together with a global combining network, the computer program product comprising:

a non-transitory computer readable medium, the computer program product comprising computer program instructions that, when executed by a computer processor, cause a computer to carry out the steps of:

for each rank value of i and j where i is greater than j and where i is less than or equal to n:

exchanging contents of data element i in data buffer j with contents of data element j in data buffer i using a swap operation including: performing a series of bitwise XOR allreduce operations through the global combining network in which the compute node storing data buffer j contributes the contents of data element i and the compute node storing data buffer i contributes the contents of data element j, and combining, by network hardware using a bitwise XOR operator, contributions of the compute nodes participating in the bitwise XOR allreduce operation.

8. The computer program product of claim 7 wherein performing the series of bitwise XOR allreduce operations further comprises contributing, by the compute nodes other than the compute nodes storing data buffer i and data buffer j, the identity value to the series of bitwise XOR allreduce operations.

9. The computer program product of claim 7 wherein the compute nodes are connected together for data communications using a plurality of data communications networks, at least one of the networks optimized for collective operations, and at least one of the data communications networks optimized for point to point operations.

* * * * *